United States Patent
MacArthur et al.

(10) Patent No.: US 6,572,835 B1
(45) Date of Patent: Jun. 3, 2003

(54) METHOD AND APPARATUS FOR PRODUCING GASEOUS SULFUR TRIOXIDE

(75) Inventors: Brian W. MacArthur, Redmond, WA (US); Walter A. Jessup, Seattle, WA (US); John C. Chittenden, Shoreline, WA (US)

(73) Assignee: The Chemithon Corporation, Seattle, WA (US)

( * ) Notice: Subject to any disclaimer, the term of this patent is extended or adjusted under 35 U.S.C. 154(b) by 0 days.

(21) Appl. No.: 08/786,756

(22) Filed: Jan. 24, 1997

(51) Int. Cl.[7] .......................... C01B 17/69; C01B 17/76; C01B 17/80
(52) U.S. Cl. .................... 423/532; 423/522; 423/533; 423/543; 422/110; 422/129; 422/160; 422/161; 422/196; 422/197; 422/198; 422/200
(58) Field of Search ................. 423/522, 533, 423/532, 543; 422/160, 161, 129, 198, 200, 110

(56) References Cited

U.S. PATENT DOCUMENTS

| | | | | |
|---|---|---|---|---|
| 652,119 A | * | 1/1900 | Knietsch | 423/533 |
| 690,062 A | * | 12/1901 | Knietsch | 423/533 |
| 1,547,167 A | * | 7/1925 | Downs | 422/160 |
| 1,812,341 A | * | 1/1931 | Jaeger | 423/533 |
| 1,900,382 A | * | 3/1933 | Jaeger | 423/522 |
| 1,900,715 A | * | 3/1933 | Jaeger | 423/533 |
| 1,900,857 A | | 3/1933 | Berry et al. | |
| 2,023,203 A | * | 12/1935 | Merriam | 423/533 |
| 2,046,816 A | | 7/1936 | Fowler, Jr. et al. | 23/299 |
| 2,954,281 A | * | 9/1960 | Schutt | 423/533 |
| 3,647,360 A | | 3/1972 | Jaeger | 23/168 |
| 3,803,297 A | | 4/1974 | Guth et al. | 423/533 |
| 4,046,866 A | | 9/1977 | Hurlburt et al. | 423/533 |
| 4,296,088 A | * | 10/1981 | Stauffer | 423/522 |
| 4,337,224 A | * | 6/1982 | Mahler et al. | 423/533 |
| 5,244,642 A | | 9/1993 | Hankins et al. | 423/242.1 |

FOREIGN PATENT DOCUMENTS

| | | | | |
|---|---|---|---|---|
| CA | 1 198 878 | 1/1986 | | 23/183 |
| DE | 113932 | 9/1900 | | |
| DE | 2716820 | * 10/1978 | | 423/533 |
| FR | 790529 | 11/1935 | | |
| FR | 2 383 881 | 10/1978 | | |
| GB | 2 088 350 A | 6/1982 | | C01B/17/54 |

OTHER PUBLICATIONS

International Preliminary Examination Report in International Application No. PCT/US98/01044 dated Apr. 20, 1999.
Official action in counterpart Indonesian Application No. P–980001 (W–20000022) dated May 16, 2002, and English-–language translation thereof.
International Search Report of PCT/US98/01044 from the European Patent Office, mailed May 26, 1998.

* cited by examiner

Primary Examiner—Steven Bos
Assistant Examiner—Timothy C Vanoy
(74) Attorney, Agent, or Firm—Marshall, Gerstein & Borun

(57) ABSTRACT

An apparatus and method for producing sulfur comprises a vessel containing a plurality of spaced-apart channels each having an upstream end communicating with an upstream manifold and a downstream end communicating with a downstream manifold. Each channel comprises a single, continuous, uninterrupted conversion stage terminating at the downstream channel end. A first mixture, of $SO_2$ and air from the sulfur burner, is introduced into the upstream manifold and flows as a stream through each of the channels where the stream is cooled and the $SO_2$ is converted in the conversion stage to $SO_3$ to produce, at the downstream channel end, a second mixture consisting essentially of $SO_3$ and air. The first mixture is not cooled between the sulfur burner and the converter. The stream flowing through the conversion stage is maintained at a temperature which sustains conversion of $SO_2$ to $SO_3$, without diluting the stream with a cooling fluid or diverting the stream outside the channel contained in the converter vessel.

66 Claims, 7 Drawing Sheets

METHOD AND APPARATUS FOR PRODUCING GASEOUS SULFUR TRIOXIDE

BACKGROUND OF THE INVENTION

The present invention relates generally to chemical processing methods and equipment and more particularly to a method and apparatus for producing gaseous sulfur trioxide.

Gaseous sulfur trioxide ($SO_3$) has many uses. In one such use, gaseous sulfur trioxide is reacted with an organic reactant (e.g. alkyl benzene) to produce a sulfonate which is used to make detergents. Gaseous sulfur trioxide is also used to condition flue gas (e.g. from power generating boilers) to facilitate the removal of fly ash from the flue gas.

Typically, $SO_3$ is produced by reacting sulfur and air in a sulfur burner to produce a first mixture consisting essentially of sulfur dioxide ($SO_2$) and air. This first gaseous mixture is then flowed into a catalytic converter where the $SO_2$ in the first mixture is converted to $SO_3$ to produce a second mixture consisting essentially of $SO_3$ and air which is withdrawn from the converter and directed to a location where the $SO_3$ in the second mixture is reacted with an organic reactant to produce a sulfonate (in one example of a use) or where the $SO_3$ is used to condition flue gas to facilitate the removal of fly ash (in another example).

There is a temperature range (e.g. 780–850° F. (416–454° C.)) which is favorable to initiate the catalytic conversion of $SO_2$ to $SO_3$. When the temperature of $SO_2$ in the first mixture is either above or below this temperature range, it is difficult if not impossible to initiate the catalytic conversion of $SO_2$ to $SO_3$. Generally, the first mixture ($SO_2$ and air) has a temperature above the favorable temperature range when the first mixture exits the sulfur burner. As a result, the first mixture is conventionally subjected to cooling between the sulfur burner and the converter. Cooling is typically accomplished by flowing the first mixture through either a radiant cooler or a heat exchanger, for example. A mixture of $SO_2$ and air which has been thus cooled enters the converter at a temperature within the range favorable for initiating the conversion of $SO_2$ to $SO_3$.

The minimum temperature for initiating catalytic conversion of $SO_2$ to $SO_3$ (the threshold or ignition temperature) varies with the catalyzing agent employed in the conversion process and can be in the range 380 to 420° C. (715–788° F.), for example. Once the conversion reaction is initiated (ignition), it can be sustained at temperatures which may drop below the ignition temperature.

The conversion of $SO_2$ to $SO_3$ is an equilibrium reaction ($SO_2 + \frac{1}{2} O_2 \rightleftharpoons SO_3$). In a typical commercial process, the oxygen required to convert $SO_2$ to $SO_3$ is provided by the air in the first mixture ($SO_2$ and air). The percentage of $SO_2$ which can be converted to $SO_3$ varies with temperature and with the concentration (partial pressure) of the gaseous initial reactants ($SO_2$ and $O_2$). The lower the temperature in the temperature range at which the conversion reaction occurs, the greater the conversion of $SO_2$ to $SO_3$. For a given concentration of reactants and assuming the conversion reaction proceeds to equilibrium, there is a theoretical conversion percentage of $SO_2$ to $SO_3$ at each temperature within the range at which conversion can be sustained. The conversion temperature range has maximum and minimum temperatures. Maximum theoretical conversion occurs at the minimum temperature at which conversion can be sustained. Depending upon the concentration of the reactants, maximum theoretical conversion can be 99% or more, at a minimum sustaining temperature of 400° C. (752° F.), for example. In conventional commercial processes, the actual conversion percentage (yield) is usually an approximation of the theoretical conversion percentage, i.e., slightly below the theoretical conversion percentage; the closeness of the approximation is influenced by a variety of parameters such as gas distribution in the porous bed containing the catalyzing agent, gas velocity through that bed, and the activity of the catalyzing agent.

As noted above, there is a maximum temperature at which the conversion reaction can be sustained, and the maximum sustaining temperature decreases as the conversion percentage increases. For example, depending upon the concentration of the initial reactants, at a temperature of about 600° C. (1112° F.) the conversion reaction reaches equilibrium when the theoretical $SO_3$ percentage is about 70%; a lower temperature, e.g., about 480° C. (896° F.) or below, may be required to obtain a theoretical conversion of 95%, and a temperature of about 400° C. (752° F.) may be required to obtain a theoretical conversion of 99%. An example of the concentrations of reactants, for achieving the results described in the preceding part of this paragraph, comprises about 10.5 vol. % $SO_2$ and 10.4 vol. % $O_2$. Generally, at a given temperature, the theoretical conversion percentage increases as the initial $SO_2$ percentage decreases and the initial $O_2$ percentage increases.

The conversion of $SO_2$ to $SO_3$ is an exothermic reaction which generates a substantial amount of heat in turn raising the temperature of the gases flowing through the converter to a temperature close to or above the temperature at which conversion can be sustained. In addition, as the conversion reaction proceeds, the percentage of $SO_3$ in the gaseous stream increases, in turn requiring a decrease in the temperature of the gaseous stream in order for further conversion to occur. These two factors, i.e., increasing temperature and increasing $SO_3$ percentage, require cooling of the gaseous stream in order to further increase the percentage of $SO_3$ in the gaseous stream.

Therefore, in order to convert all or substantially all of the $SO_2$ to $SO_3$, it has been conventional to conduct commercial conversion processes in two or more conversion stages with the partially converted gaseous mixture from one stage being subjected to cooling between that stage and the next stage. Typically, cooling has been accomplished by flowing the partially converted gaseous mixture through either a radiant cooler or a heat exchanger located outside of the converter vessel. Alternatively, the partially converted mixture is diluted between stages with a cooling fluid, such as cool air, which, in addition to cooling the partially converted gaseous mixture, necessarily reduces the concentration of $SO_2$ and $SO_3$ in the partially converted gaseous mixture and increases its volume.

Cooling between stages reduces the temperature of the gaseous stream to a temperature at which catalytic conversion can be initiated and then sustained for awhile, keeping in mind that as conversion once again proceeds, the temperature of, and the percentage of $SO_3$ in, the gaseous stream both increase, eventually again producing impediments to further conversion, as described above.

A converter employing two conversion stages together with a single cooling stage therebetween can, under appropriate circumstances, convert up to about 97% of the $SO_2$ to $SO_3$. A gaseous mixture in which up to about 97% of the $SO_2$ has been converted to $SO_3$ is acceptable for use in the conditioning of flue gas. However, when the $SO_3$ is to be employed as a sulfonating agent, it is oftentimes desirable to employ a gaseous mixture in which 99% (or more) of the $SO_2$ has been converted to $SO_3$. In such a case, the converter employs three conversion stages (or more) with a cooling stage between the first and second conversion stages and another cooling stage between the second and third conversion stages, etc.

A gaseous mixture consisting essentially of air and $SO_3$ is usually cooled after it exits the converter and before the $SO_3$ therein is employed as a sulfonating agent. Typically, the gaseous mixture exiting the converter would not be cooled, to any substantial extent, when the $SO_3$ is employed as a flue gas conditioning agent.

An example of a conventional process for producing $SO_3$ for use as a sulfonating agent is described in UK published patent application GB 2 088 350 A. An example of a conventional process for producing $SO_3$ employed as a conditioning agent for flue gas is described in U.S. Pat. No. 5,244,642. The subject matters described in both of these publications are incorporated herein by reference.

There are drawbacks to the above-described processes for producing gaseous $SO_3$. These drawbacks arise from the need to subject the first gaseous mixture to cooling between the sulfur burner and converter; the need to subject the gaseous mixture undergoing conversion to cooling between the conversion stages; and the need to provide the converter with a plurality of conversion stages. These needs entail substantial expenditures for cooling equipment and the attendant piping, and they enlarge substantially the space occupied by the $SO_3$-producing equipment package.

SUMMARY OF THE INVENTION

The present invention avoids the shortcomings of the prior art processes and apparatuses described above by utilizing a method and apparatus which eliminates the need for cooling equipment between the sulfur burner and the converter and between conversion stages of the converter.

In accordance with the present invention, the first mixture, consisting essentially of sulfur dioxide and air, is flowed from the sulfur burner directly to the catalytic converter without cooling the first mixture between the sulfur burner and catalytic converter. The catalytic converter comprises a vessel containing a plurality of spaced-apart channels each having upstream and downstream ends and each containing an agent for catalyzing the conversion of $SO_2$ to $SO_3$. The converter also contains an upstream manifold, at the upstream ends of the channels, for receiving the gaseous mixture comprising $SO_2$ and air and for directing portions of the first mixture into the upstream ends of the channels to form a plurality of streams containing the first mixture at the upstream channel ends.

The $SO_2$ in the first mixture is converted to $SO_3$, as the streams flow through the channels, to produce in the streams a second mixture consisting essentially of $SO_3$ and air at the downstream ends of the channels. Each of the streams is cooled substantially continuously as it flows through its channel and as the $SO_2$ therein undergoes conversion to $SO_3$. Located within the converter, at the downstream ends of the channels, is a downstream manifold for receiving and combining the streams as they flow out of the channels.

Cooling of the streams as they flow through the channels is performed without introducing a cooling medium into any of the streams and without diverting any of the streams outside of the channels in the vessel. Each stream is cooled substantially immediately upon entering the upstream end of a channel and is subjected to cooling substantially continuously along substantially the entire length of the channel from its upstream end to its downstream end. The channels are defined by a multiplicity of spaced-apart tubular members which are cooled by contacting the exterior surface of each tubular member with a fluid cooling medium (e.g. cool air) along substantially the entire length of the tubular member, from its upstream end to its downstream end.

Each channel comprises an initial, upstream cooling portion and a single, continuous, uninterrupted conversion stage having upstream and downstream ends. The conversion stage terminates, in most embodiments, at the downstream channel end and contains all of the catalyzing agent to which the $SO_2$ is subjected in the converter. In one embodiment, the channel may also include a downstream cooling portion having an upstream end communicating with the downstream end of the conversion stage and terminating at the downstream end of the channel.

Cooling in accordance with the present invention maintains the gaseous stream at a temperature which will sustain conversion of the $SO_2$ to $SO_3$ substantially continuously, from the upstream end to the downstream end of the conversion stage and until the conversion of $SO_2$ and $SO_3$ exceeds 95%, typically producing a yield of 97% $SO_3$ or more; a method in accordance with the present invention produces a yield which approaches (i.e., exceeds 99% of) the maximum theoretical conversion percentage, producing a yield of 99%, for example.

Because there is no cooling device between the sulfur burner and the converter, and because there is no cooling device, external of the converter, for cooling the gaseous mixture undergoing conversion, the sulfur burner vessel and the converter vessel can be positioned relatively close together compared to the distance between these vessels in an apparatus employing such cooling devices. Similarly, the length of the conduit between the sulfur burner and the converters is correspondingly small. This reduces substantially the space occupied by the whole of the $SO_3$-producing package, which is desirable.

The present invention may be employed over a wide range of $SO_2$ concentrations, e.g., 4–12%. (As used herein, when $SO_2$ and $SO_3$ contents are expressed as per cents, the per cents are volume per cents.) Equipment and processing expedients which can be employed to produce $SO_2$ concentrations on the high side of the aforementioned range (and higher) are described in the two patent publications identified above. The higher the $SO_2$ concentration, the smaller the volume of the processing equipment and piping needed to handle the gaseous stream containing the $SO_2$. When, as here, the percentage of $SO_2$ converted to $SO_3$ is high (e.g. 97% and higher), the $SO_3$ concentration is essentially the same as the $SO_2$ concentration, and absent dilution of the $SO_3$ with cooling air, the volume of the processing equipment and piping needed to handle the gaseous stream containing the $SO_3$ is relatively small. The smaller the volume of the processing equipment and piping needed to handle the gaseous streams, the smaller the capital expense and the smaller the space occupied by the processing equipment, all of which is desirable.

Other features and advantages are inherent in the method and apparatus claimed and disclosed or will become apparent to those skilled in the art from the following detailed description in conjunction with the accompanying diagrammatic drawings.

DETAILED DESCRIPTION

Figures 1, 1A:
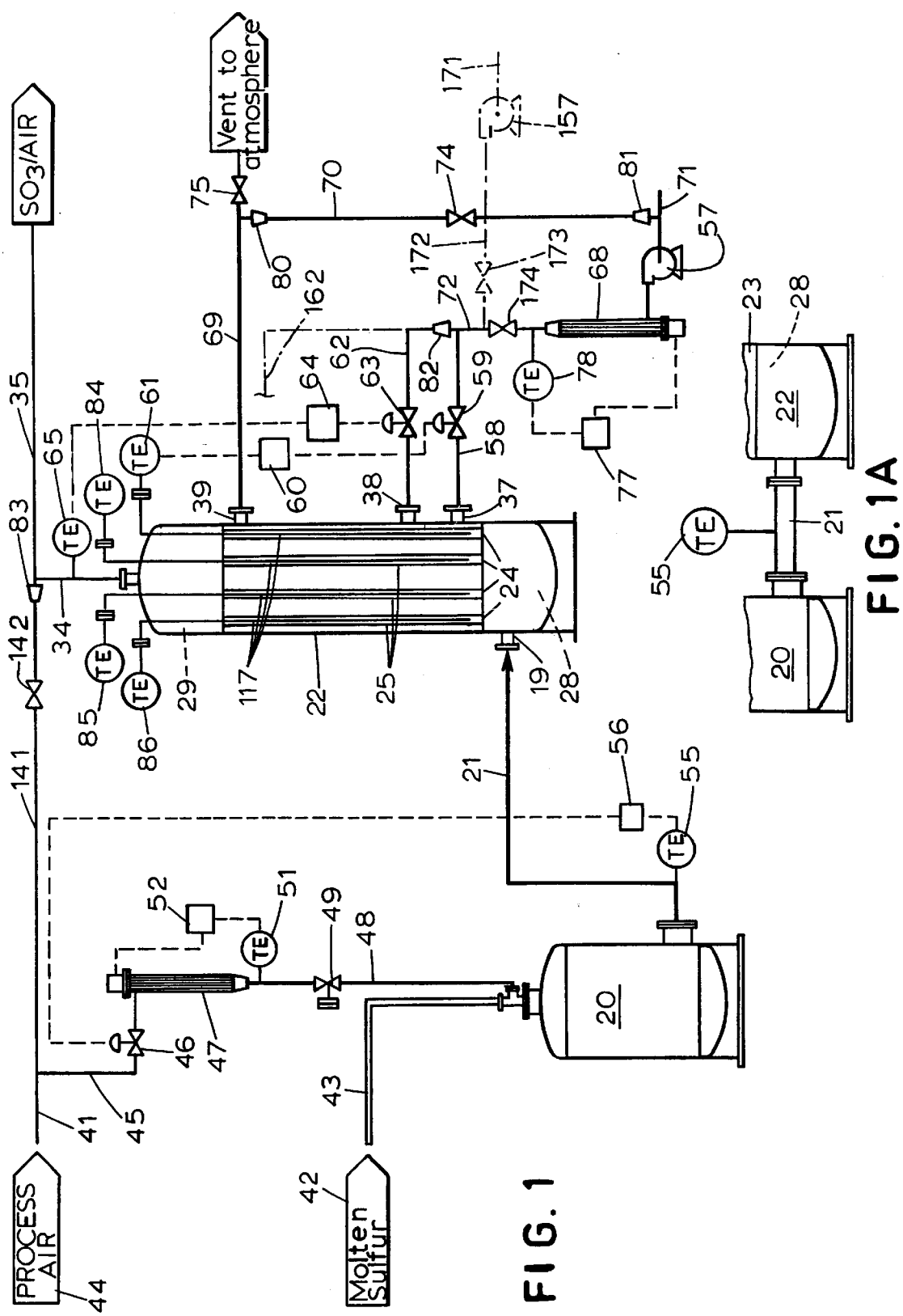
FIG. 1 is a flow diagram of a method employing an embodiment of the present invention.
FIG. 1a is a fragmentary, elevational view illustrating the close spacing between a sulfur burner and a converter when employing apparatus in accordance with the present invention.
Figure 2:
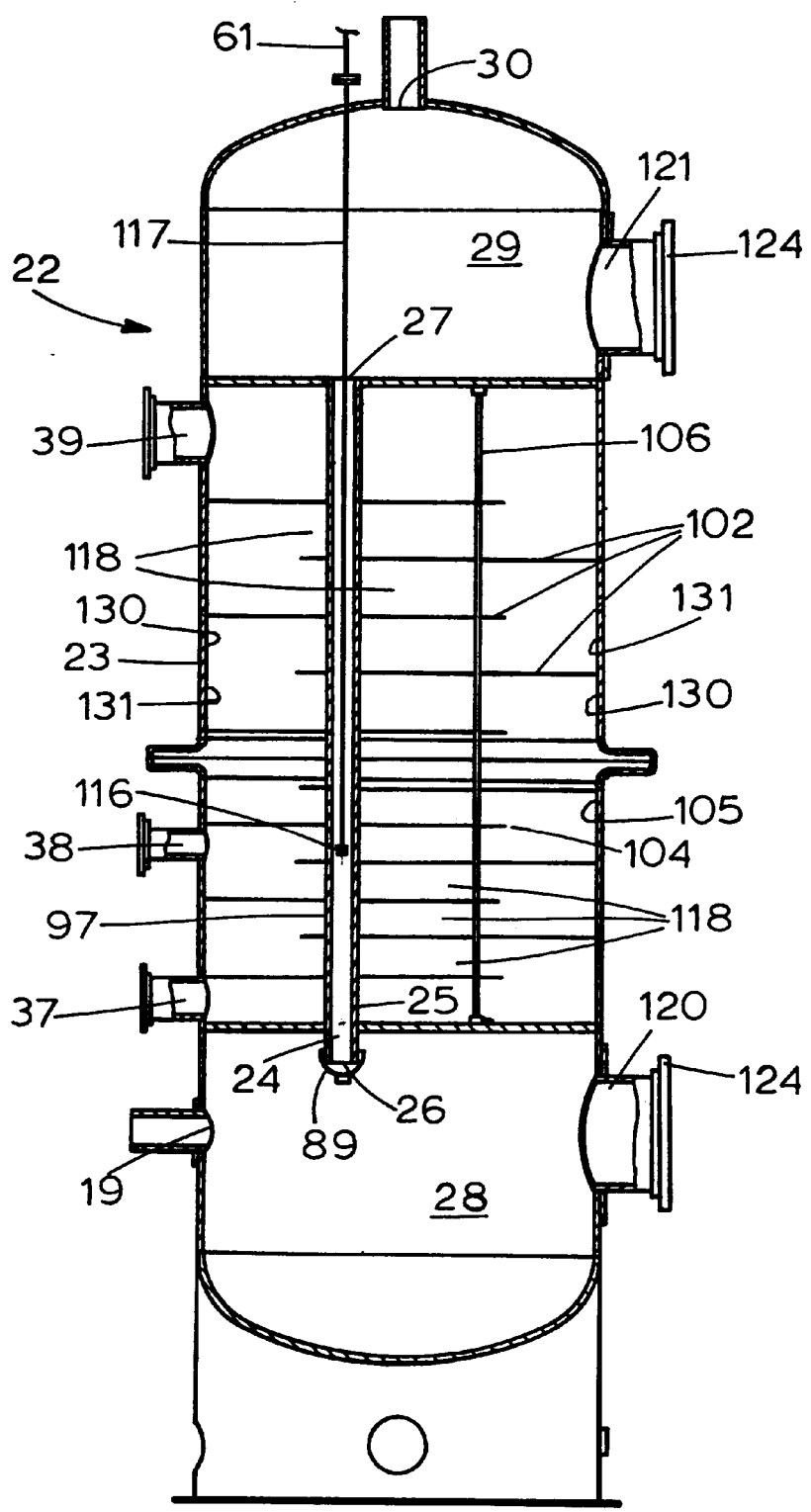
FIG. 2 is a vertical sectional view of a converter in accordance with an embodiment of the present invention, with some parts of the converter removed.
Figure 7:
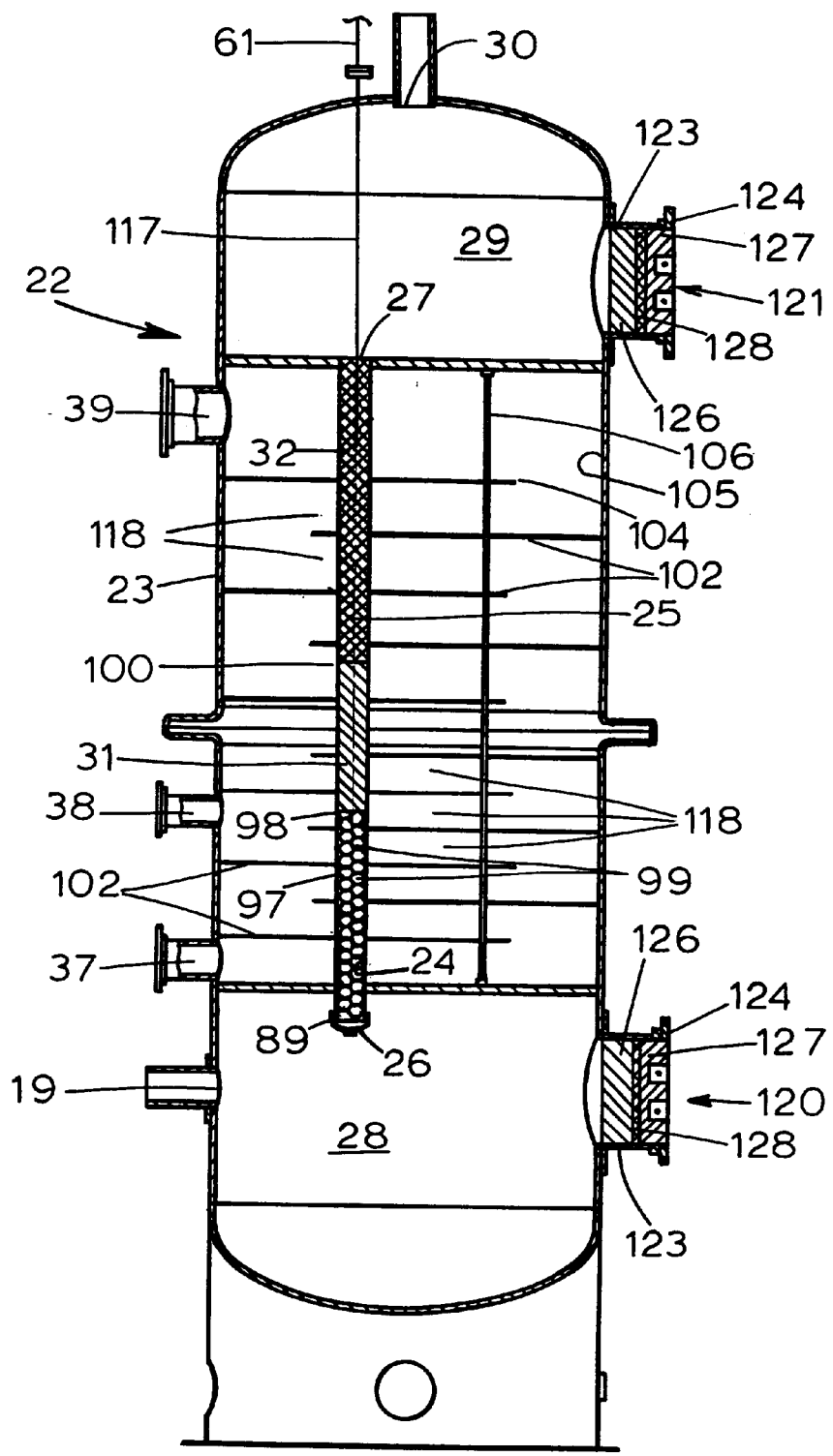
FIG. 7 is a vertical sectional view of the converter, similar to FIG. 2, with some parts removed, and showing other parts not shown in FIG. 2.

Referring initially to FIGS. 1, 1a, 2 and 7, sulfur and air are reacted at a sulfur burner 20 to produce a first mixture consisting essentially of sulfur dioxide ($SO_2$) and air. The following discussion assumes, for illustrative purposes, an $SO_2$ concentration of 8%. The first mixture is flowed from sulfur burner 20 through a line 21 to a catalytic converter 22. Converter 22 comprises a vessel 23 containing a plurality of channels 24 each defined by a tubular member 25 (only one of which is shown in FIGS. 2 and 7). Each channel 24 has upstream and downstream ends 26, 27 respectively, and each channel contains agents at 31, 32 (FIG. 7) for catalyzing the conversion of $SO_2$ to $SO_3$. Each channel 24 comprises a conversion stage defined by that part of the channel which contains the catalyzing agents at 31, 32.

Converter 22 comprises an upstream manifold 28 communicating with the upstream end 26 of each channel 24. Upstream manifold 28 receives the first gaseous mixture and directs a portion of the first gaseous mixture into the upstream end 26 of each channel 24 to form a plurality of streams containing the first mixture at upstream channel ends 26.

Each stream flows through a respective channel 24 from its upstream channel end 26 to its downstream channel end 27. As a stream flows through its channel 24, the $SO_2$ therein is converted, in the presence of catalyzing agent at 31, 32, to $SO_3$; conversion produces in the stream a second mixture consisting essentially of $SO_3$ and air at downstream channel end 27. Each stream is cooled as it flows through its channel 24 and as the $SO_2$ in the stream undergoes conversion to $SO_3$. Cooling of the stream is substantially continuous from upstream channel end 26 to downstream channel end 27. Conversion of $SO_2$ to $SO_3$ is sustained without interruption from the upstream end to the downstream end of the conversion stage at 31, 32.

Converter 22 comprises a downstream manifold 29 communicating with the downstream end 27 of each channel 24. Manifold 29 receives and combines the streams as they flow out of channels 24.

The first gaseous mixture ($SO_2$ and air) enters converter 22 through an inlet opening 19 communicating with inlet manifold 28. The second gaseous mixture (containing, e.g. 8% $SO_3$) is withdrawn from converter 22 through an outlet opening 30 communicating with downstream manifold 29. The gaseous mixture which exits converter 22 through outlet opening 30 is conducted by lines 34–35 (FIG. 1) in a downstream direction, away from converter 22, for contact with another fluid stream containing a material with which the $SO_3$ will react or act upon (e.g. as in a sulfonation reaction or as in the conditioning of a flue gas).

In one embodiment, the gaseous mixture in line 34 may be combined in line 35 with process air from a main process air line 41 to dilute the concentration of $SO_3$ in the mixture (e.g. from 8% to 4%). Dilution air flows from line 41 through a branch line 141 having a valve 142 for controlling the flow of dilution air. A diluted $SO_3$ concentration may be desirable in instances where the gaseous mixture of $SO_3$ and air is cooled and used as a sulfonating agent.

When the $SO_3$/air mixture is to be used in a sulfonating process, the mixture is cooled, and any trace of condensed oleum mist is filtered out. Oleum is sulfuric acid ($H_2SO_4$) saturated with excess $SO_3$; oleum is produced when the $SO_3$ in the mixture reacts with residual $H_2O$ which has condensed out of the mixture upon cooling of the mixture.

As best illustrated in FIG. 1a, the distance between sulfur burner 20 and converter 22 is relatively small, and the length of line 21, which connects sulfur burner 20 and converter 22, is correspondingly short. In addition, there is no cooling device of any kind, between sulfur burner 20 and converter 22, which could produce a significant amount of cooling of the first gaseous mixture as it flows between the sulfur burner and the converter. In an arrangement containing such a cooling device, the spacing between the sulfur burner and the converter would be relatively large compared to the spacing illustrated in FIG. 1a, in order to accommodate the cooling device; and the length of the conduit between the sulfur burner and the converter will be correspondingly large compared to the length of line 21 illustrated in FIG. 1a.

As a result of employing an arrangement in accordance with the present invention, the first gaseous mixture flows from sulfur burner 20 into catalytic converter 22 without subjecting the first mixture to any significant amount of cooling at any location between the sulfur burner and channels 24 in converter 22.

As previously noted in connection with the embodiment described above, converter 22 is employed without employing a separate cooling device between sulfur burner 20 and converter 22. However, there can be situations in which converter 22 may be employed with such a cooling device, e.g., when converter 22 replaces a conventional converter in an existing system already containing a separate cooling device between the sulfur burner and the converter; employment of converter 22 is advantageous in many types of $SO_3$-producing systems and is not limited to systems without a separate cooling device.

Tubular members 25 in converter 22, and the streams flowing through the tubular members, are cooled by introducing a cool fluid cooling medium into the interior of converter vessel 23 through inlets 37, 38 and then withdrawing the warmed fluid medium through an outlet 39 after the fluid medium has extracted heat from the outsides of the tubular members. As a result, the streams in channels 24 are cooled without introducing a cooling medium into any of the streams and without diverting any of the streams outside of converter vessel 23 within which channels 24 and the gaseous streams are totally contained.

In the embodiment of the invention illustrated in FIG. 2, fluid cooling medium inlets 37, 38 and outlet 39 are shown vertically aligned with inlet 19 through which flows the gaseous mixture from sulfur burner 20. In the embodiment shown in the flow diagram (FIG. 1), inlets 37, 38 and outlet 39 are shown not vertically aligned with inlet 19.

Each channel 24 comprises a single, continuous, uninterrupted conversion stage at 31, 32 terminating at downstream channel end 27 and containing all of the catalyzing agent to which the $SO_2$ is subjected in converter 22. The conversion of $SO_2$ to $SO_3$ in the single conversion stage typically exceeds 97% by the time a stream reaches its downstream channel end 27 (e.g. a conversion of 99%).

Referring again to FIG. 1, the process and equipment illustrated therein will now be described in more detail. Sulfur from a sulfur source 42 is directed through a line 43 into the upstream end of sulfur burner 20. In the embodiment of FIG. 1, sulfur burner 20 is vertically disposed; a horizontally disposed sulfur burner also may be employed. Process air from a process air source 44 flows through main process air line 41 and then through a branch line 45, having a control valve 46, to a heater 47 were the air can be heated before it enters sulfur burner 20. Air flows from heater 47 through a line 48, containing a valve 49, to the upstream end or top of sulfur burner 20. The temperature of the process air in line 48 is sensed by a temperature measuring element 51 which sends a signal to a controller 52 which controls heater 47. Air entering sulfur burner 20 is heated during start-up of the system illustrated in FIG. 1.

The amount of process air flowing through branch line 45 is regulated by valve 46 which in turn is controlled by a controller 56 which operates in response to a signal from a temperature measuring element 55 which senses the temperature of the uncooled first gaseous mixture flowing through line 21 connecting sulfur burner 20 to converter 22. In another embodiment, process air flow control valve 46 can be controlled in response to the flow of sulfur into sulfur burner 20, for certain predetermined flow rates of sulfur; an arrangement of this type is described in the aforementioned U.S. Pat. No. 5,244,642.

As previously noted, there is a valve 49 on line 48, between heater 47 and sulfur burner 20. Valve 49 is normally open but closes automatically when there is a failure of the blower (not shown) which delivers process air from air source 44. Closure of valve 49 prevents the back-up of corrosive sulfur oxides from a location downstream of valve 49 into air heater 47 and the air supply system upstream of heater 47 and thereby protects from corrosion everything upstream of valve 49.

Fluid cooling medium introduced into converter 22 through inlets 37, 38 is provided by an air blower 57 which blows cooling air to inlet 37 through a line 58 containing a control valve 59 controlled by a controller 60 which operates in response to a signal from a temperature measuring element 61 which senses the temperature of the gaseous stream before it undergoes conversion in channel 24.

Cooling air from blower 57 enters inlet 38 through a line 62 having a control valve 63 controlled by a controller 64 which operates in response to a signal from a temperature measuring element 65 which senses the temperature of the second gaseous mixture exiting converter 22 through line 34.

During certain periods when there is no hot first gaseous mixture of $SO_2$ and air entering converter 22, and no conversion of $SO_2$ to $SO_3$ with its attendant generation of heat, it is desirable to otherwise provide an elevated temperature within channels 24 of converter 22; provision of such an elevated temperature is desirable during start-up and stand-by operation for the system illustrated in FIG. 1. Any elevated temperature above ambient temperature is helpful, up to 850° F. (454° C.). A preferred temperature is around 800° F. (427° C.), a temperature in the middle of a temperature range (780–850° F. (416–454° C.)) which is favorable for initiation of the catalytic conversion of $SO_2$ to $SO_3$. Channels 24 can be heated from ambient temperature to a temperature in the favorable temperature range by the heat from the first gaseous mixture as that mixture flows through the channels after start-up or stand-by operation of the system; but when doing so, there is a delay in attaining the desired temperature. Providing channels 24 with an elevated temperature during start-up and stand-by operation eliminates or reduces that delay.

The equipment for maintaining an elevated temperature within channels 24 of converter 22 during start-up or stand-by operation comprises a heater 68 and a recycle loop including component lines 69 and 70. Air at ambient temperature is drawn into blower 57 through an inlet line 71 and then directed into heater 68 where the air is heated. Hot air exits heater 68 through a line 72 from which the air flows into branch lines 58 and 62 communicating with converter inlets 37, 38 respectively. Heated air is withdrawn from converter 22, during start-up and stand-by operation, through outlet 39 and flows through recycle component lines 69, 70 to inlet line 71 of blower 57. When hot air is recycled back to converter 22, a valve 74 on recycle line 70 is maintained in an open condition, and a valve 75 on line 69 downstream of its junction with line 70, is maintained in a closed condition. The temperature of the air exiting heater 68 through line 72 is sensed by a temperature measuring element 78 which sends a signal to a controller 77 for controlling heater 68.

When the hot first gaseous mixture is flowing into converter 22, it becomes no longer necessary to artificially heat channels 24 of converter 22; valve 74 on recycle line 70 is then closed, and valve 75, on line 69 downstream of line 69's junction with line 70, is opened. This vents, to the atmosphere, fluid medium exiting converter 22 through outlet 39.

The volume of cool air required to cool the streams flowing through channels 24, as the $SO_2$ undergoes conversion to $SO_3$, is substantially greater than the volume of heated air required to maintain channels 24 at the desired temperature during start-up or stand-by operation. In some embodiments of the present invention, blower 57 is an auxiliary blower which is smaller than, and separate and apart from, a main blower 157 which is not connected to heater 68 and recycle lines 69, 70. In those embodiments in which blower 57 is an auxiliary blower, main blower 157 is connected directly to line 72 by a line 172, by-passing heater 68, and the inlet line 171 to blower 157 has no connection to recycle line 70. The smaller, auxiliary blower is used during start-up and stand-by operation; the larger, main blower 157 is used during generation of $SO_3$ from $SO_2$. There is a valve 173 on line 172, and a valve 174 on line 72, between heater 68 and the junction of line 172 with line 72. When main blower 157 is operating, valve 173 is open and valve 174 is closed. When auxiliary blower 57 is operating, valve 173 is closed and valve 174 is open.

The equipment depicted in FIG. 1 includes a number of line reducers. There is a line reducer 80 on recycle line 70 near its junction with line 69; and there is another line reducer 81 on line 70 near its junction with line 71. There is a line reducer 82 on air inlet line 62 near its junction with line 72; and there is a line reducer 83 on branch process air line 141 near the junction of line 141 with converter outlet line 35. As depicted in FIG. 1, each line reducer tapers from a wide end to a narrow end. A line which communicates with a line reducer adjacent the narrow end of the line reducer has a cross-section smaller than the cross-section of the line which communicates with the line reducer at its wide end.

Converter embodiment 22 illustrated in FIGS. 1, 2 and 7 is vertically disposed. In other embodiments of the present invention, the converter may be horizontally disposed. In vertically disposed converter embodiment 22, the upstream end of the converter is at the bottom of the converter vessel; alternatively, the upstream end can be at the top of the vessel, whereby downstream flow of the gaseous mixtures through the converter would be vertically downward.

Cooling fluid flow through the converter can be in the same downstream direction as the flow of the gaseous mixtures through the converter (co-current flow); alternatively cooling fluid flow can be in a direction opposite to the direction of flow of the gaseous mixtures (counter-current flow). Either type of flow, co-current or counter current, may be employed in all dispositions of the converter, both vertical and horizontal.

In the embodiment of FIG. 1, sulfur burner 20 is shown spaced from converter 22. In other embodiments, the sulfur burner and the converter may be constructed as a single continuous vessel, e.g. the sulfur burner may be vertically stacked with converter 22, either below or above converter 22; or the sulfur burner and converter may both be horizontally disposed as parts of a single continuous vessel. In one embodiment of a vertical arrangement, in which the sulfur burner is below the converter, sulfur and process air would enter the sulfur burner adjacent the bottom of the sulfur burner, and the first gaseous mixture ($SO_2$ and air would exit the top of the sulfur burner through an exit opening communicating directly with the converter's upstream manifold 28. In a vertical arrangement in which the sulfur burner is above the converter, the entire arrangement described in the preceding sentence would be inverted; and in a horizontally disposed system, the vertical arrangement described in the preceding sentence would be rotated minty degrees through a vertical plane.

Converter 22 and its components will now be described in greater detail, with reference to FIGS. 2–7. Converter vessel 23 is vertically disposed and has a top and bottom. Upstream manifold 28 is located adjacent the vessel bottom, and downstream manifold 29 is located adjacent the vessel top. Channels 24 are vertically disposed and are located totally within vessel 23 between upstream manifold 28 and downstream manifold 29. The converter may contain a very large number of channels 24, fifty-one such channels being shown in FIG. 4.

Figure 4:
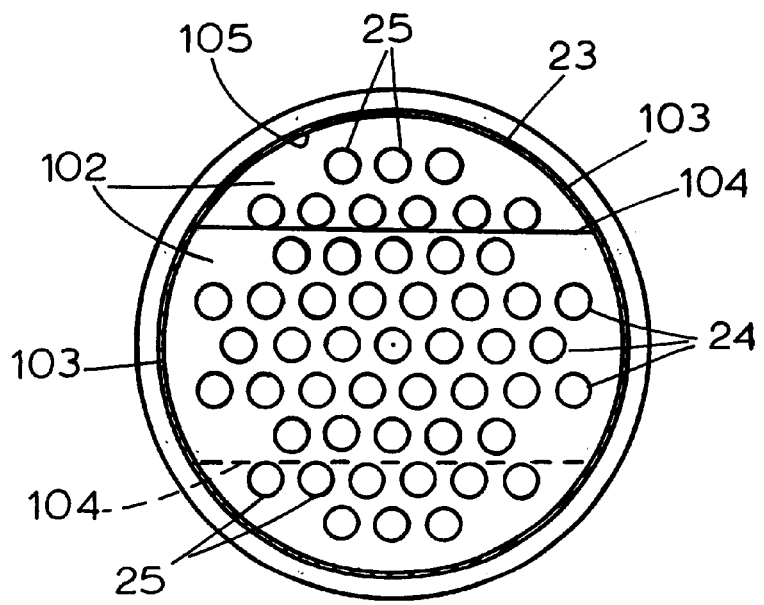
FIG. 4 is a horizontal sectional view taken through the converter between the upstream and downstream ends of the converter channels.
Figure 5:
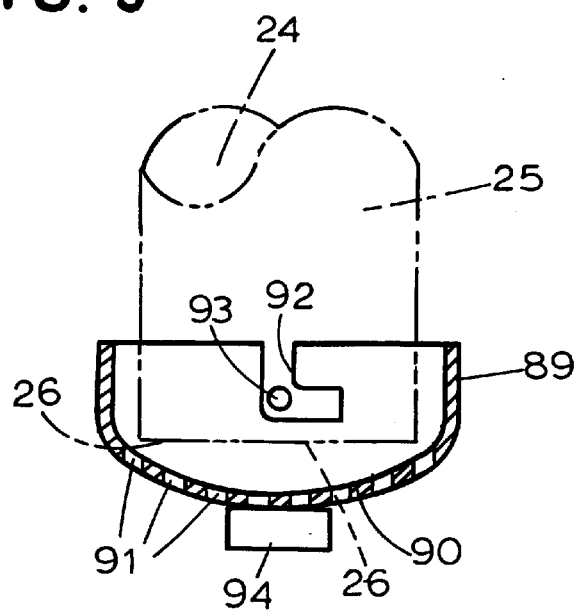
FIG. 5 is an enlarged, vertical sectional view illustrating the upstream end of a converter channel.
Figure 6:
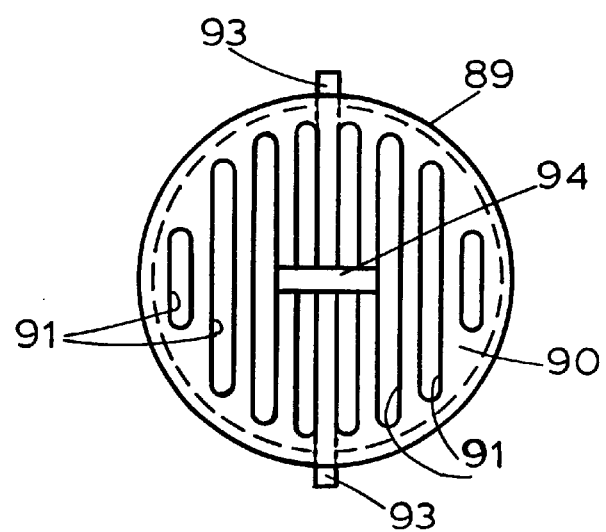
FIG. 6 is an enlarged bottom view illustrating the upstream end of a converter channel.

Each of channels 24 is defined by an elongated tubular member 25 disposed in spaced-apart relation to the other tubular members (FIG. 4). Converter vessel 23 has an external shell defining an interior in which tubular members 25 are located. Each tubular member 25 is composed of an uninsulated, thermally conductive material, such as high-temperature-resistant stainless steel. The external shell of converter vessel 23, which is not exposed to either of the gaseous mixtures, is composed of non-stainless, carbon steel, typically boiler plate steel. Upstream manifold 28 and conduit 21, connecting sulfur burner 20 and converter 22, are exposed to $SO_2$ gas at a relatively high temperature (e.g., 677° C. (1250° F.) or higher) and are composed of high-temperature-resistant stainless steel. Downstream manifold 29 is exposed to $SO_3$ gas at a lower temperature (e.g., 443° C. (830° F.) or lower) and, depending upon the absence of a corrosive environment in manifold 29, it may be composed of the same carbon steel as the external shell of converter vessel 23, for example; or manifold 29 may be composed of stainless steel, like upstream manifold 28.

The downstream end 27 of channel 24 is open and communicates with downstream manifold 29. The channel's upstream end 26 is covered by a cap 89 (FIGS. 5–6) having a bottom 90 containing a plurality of slots 91 through which the gaseous first mixture, consisting essentially of $SO_2$ and air, enters channel 24 from upstream manifold 28. Cap 89 is removably mounted on tubular member 25, at upstream channel end 26, by a pair of bayonet-type connections each comprising a right-angle slot 92 in the side wall of cap 89 and a pin 93 on tubular member 25 adjacent upstream end 26 of channel 24. A small, twist-type handle 94 on the bottom of cap 89 facilitates manual rotation of cap 89 to attach it to, and detach it from, tubular member 25.

Referring to FIG. 7, each conversion channel 24 comprises a single, continuous, uninterrupted conversion stage at 31, 32 terminating at downstream channel end 27. Each channel 24 also comprises an upstream cooling portion 97 extending downstream from upstream channel end 26 and containing a multiplicity of mixing spheres 99 for mixing $SO_2$ and air in the stream of gaseous first mixture as the stream flows through the channel's upstream cooling portion 97. Mixing spheres 99 are supported atop cap 89.

Extending downstream from and supported atop mixing spheres 99, is a high temperature catalyzing agent located in channel 24 at 31 and constituting part of the single, uninterrupted, continuous conversion stage of channel 24. The high temperature catalyzing agent at 31 extends downstream to an intermediate channel location 100 (FIG. 7) which is between upstream and downstream channel ends 26, 27. Supported atop the high temperature catalyzing agent, at 32, is a high activity catalyzing agent extending downstream from intermediate channel location 100 to downstream channel end 27.

Channel 24 has exterior walls defined.by tubular member 25. Spheres 99 in upstream cooling portion 97 not only mix the $SO_2$ and air in the gaseous stream flowing through upstream cooling portion 97, but also conduct heat from that stream to the channel walls, as the stream flows through upstream cooling portion 97.

Spheres 99 are composed of a high temperature, vitrified cement and are typically one inch in diameter. Upstream cooling portion 97 typically extends along the upstream one-third of the length of channel 24. The high temperature catalyzing agent at 31 is typically a conventional, commercially available material and extends along a channel portion which constitutes approximately the next 20–25% of the length of channel 24. The high activity catalyzing agent at 32 is typically a conventional, commercially available material and, together with the catalyzing agent at 31, occupies approximately two-thirds of the length of channel 24. Most of the conversion of $SO_2$ to $SO_3$ in the stream flowing through channel 24 occurs in that part of the channel occupied by the high temperature catalyzing agent at 31. The high activity catalyzing agent at 32 completes the conversion of $SO_2$ to $SO_3$. The conversion of $SO_2$ to $SO_3$ typically exceeds 97% (e.g., a yield of 99%) at downstream channel end 27.

One example of spheres 99 has the following composition:

| Ingredient | Wt. % |
|---|---|
| silicon dioxide | 64.1 |
| aluminum oxide | 29.3 |
| titanium oxide | 1.2 |
| ferric oxide | 0.8 |
| calcium oxide | 0.7 |
| magnesium oxide | 0.7 |
| potassium oxide | 1.2 |
| sodium oxide | 1.2 |

The preceding two paragraphs describe one example of a size, shape and composition for the particles (spheres 99) in upstream cooling portion 97. Particles having other sizes, shapes and compositions may be employed in upstream cooling portion 97, in lieu of spheres 99, so long as the particles employed in cooling portion 97 substantially perform the mixing and heat-conducting functions of spheres 99.

An example of a commercially available, high temperature catalyzing agent for use at 31 is a ring material available from BASF Corporation, Mt. Olive, N.J., under the common chemical name vanadium pentoxide catalyst, and containing, as ingredients, calcined diatomaceous earth, vanadium oxide, potassium oxide and sodium oxide.

An example of a commercially available, high activity catalyzing agent for use at 32 is also a ring material, available from BASF Corporation under the common chemical name vanadium catalyst, and containing, as ingredients, calcined diatomaceous earth, vanadium oxide, silicic acid, sulfur, cristobolite ($SiO_2$) and sulfate salts of sodium and potassium.

In addition to the catalyzing agents described in the preceding two paragraphs, other commercially available catalyzing agents conventionally employed for conversion of $SO_2$ to $SO_3$ may be employed at 31 and 32.

A stream of the first gaseous mixture enters channel 24 at upstream channel end 26 at a temperature which is substantially higher than the temperature range which is favorable for initiation of the catalytic conversion of $SO_2$ to $SO_3$ (e.g., 780–850° F. (416–454° C.)). More particularly, the first gaseous mixture exits sulfur burner 20 at a temperature of about 1250° F. (677° C.), for example, or even higher. The temperature of the stream of first gaseous mixture is cooled in upstream cooling portion 97 of channel 24 to a temperature within the range which is favorable for initiating conversion of $SO_2$ to $SO_3$. Thus, the gaseous stream enters the conversion stage at a temperature which is typically about 820° F. (438° C.). As the gaseous stream flows through the high temperature catalyzing agent at 31, and through the high activity catalyzing agent at 32, the gaseous stream is continuously cooled to maintain the temperature of the gaseous stream within a temperature range which will sustain conversion of $SO_2$ to $SO_3$ in the gaseous stream from the upstream end to the downstream end of the conversion stage at 31, 32.

Most of the heat generated by the conversion of $SO_2$ to $SO_3$ is generated as the stream flows through the high temperature catalyzing agent at 31. A lesser amount of heat is generated as the stream moves through the high activity catalyzing agent at 32. Accordingly, the cooling requirements for that part of the conversion stage at 31 are greater than the cooling requirements for that part of the conversion stage at 32. Similarly, the cooling requirements in upstream cooling portion 97 of channel 24 are greater than the cooling requirements in that part of the conversion stage at 32. The manner in which the present invention meets these cooling requirements will now be described, with reference to FIGS. 2, 4 and 7.

As previously described, a fluid cooling medium is introduced into the interior of converter vessel 23, between upstream manifold 28 and downstream manifold 29 through inlets 37, 38. Disposed within the interior of converter vessel 23, between upstream manifold 28 and downstream manifold 29 are a plurality of horizontally disposed, plate-like baffles 102. Each baffle 102 has a multiplicity of openings through which extend vertically disposed tubular members 25 (FIG. 4). (Vessel 23 in FIG. 4 has been rotated 90° about a vertical axis relative to the disposition of vessel 23 in FIGS. 2 and 7).

With further reference to FIG. 4, each baffle 102 has a convexly curved edge 103 abutting against the circular inner surface 105 of converter vessel 23, along a major part of the circumference of circular inner surface 105. Each baffle 102 also has a linear edge 104 spaced from and in non-abutting relation with a smaller part of the vessel's circular inner surface 105. The unabutted part of vessel inner surface 105 and linear edge 104 of baffle 102 define an opening through which fluid cooling medium can pass.

Figure 10:
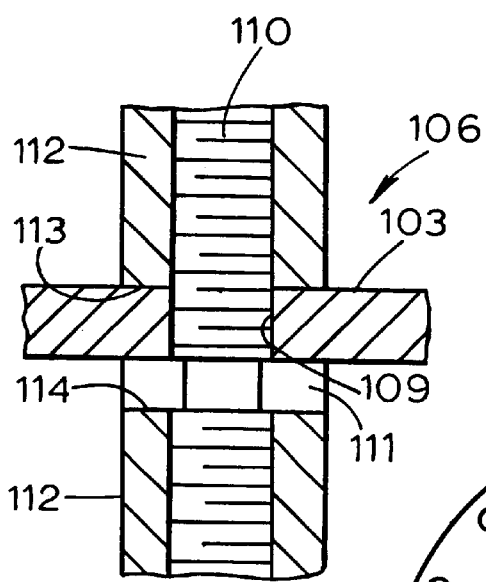
FIG. 10 is an enlarged, fragmentary, sectional view of a portion of the converter.

Baffles 102 are supported in their horizontal dispositions by a vertically disposed support arrangement 106 (FIGS. 2 and 7), the details of which are illustrated in FIG. 10. Each baffle 103 has an opening 109 for receiving a threaded rod 110 which extends between the upper end of upstream manifold 28 and the lower end of downstream manifold 29. Rod 110 is threadedly engaged by a plurality of nuts 111 each of which underlies and supports a baffle 103. Baffles 103 are vertically spaced apart by tubular spacing elements 112 each having a lower end 113 resting atop a baffle 103 and an upper end 114 engaging below a nut 111.

As shown in FIGS. 2,4 and 7, a baffle linear edge 104 in a given baffle overlaps the baffles above and below the baffle carrying that linear edge. By staggering baffles 102 in the manner illustrated in FIGS. 2, 4 and 7, the baffles define a tortuous flow path comprising a multiplicity of connected, adjacent path parts 118 each extending in a direction transverse to the direction in which channel 24 extends from upstream channel end 26 to downstream channel end 27 (FIGS. 2 and 7). Referring to FIG. 2, each part 118 of the tortuous flow path has an upstream end 130 and a downstream end 131, and each path part 118 extends from its upstream end 130 to its downstream end 131 in a direction opposite the direction in which an adjacent connected path part extends.

As previously noted, each channel 24 is defined by a tubular member 25 having an exterior surface, and fluid cooling streams are blown by air blower 57 through each of converter vessel inlets 37 and 38. Lower cooling air inlet 37 and baffles 102 cooperate to direct a first fluid cooling stream into contact with the exterior surface of each tubular member 25 substantially continuously from a first channel location adjacent upstream end 26 to a second channel location downstream of the first channel location and corresponding to location 98 where cooling spheres 99 meet high temperature catalyzing agent 31 (FIG. 7). Location 98 is substantially horizontally aligned with upper cooling air inlet 38. A second fluid cooling stream constituting cooling air from blower 57 flows into converter vessel 23 from upper inlet 38 and mixes with the first fluid cooling stream at location 98.

Those baffles 102 located downstream of upper inlet 38 direct the mixture of the fluid cooling streams into contact with the exterior surface of tubular members 25 substantially continuously from second channel location 98 to a third channel location adjacent downstream channel end 27.

The walls of each tubular member 25 constitute the walls of the corresponding channel 24. Those baffles which are located between upstream manifold 28 and second channel location 98 constitute structure for directing the first fluid cooling medium into contact with the channel walls of the channel's upstream cooling portion 97, i.e. the channel portion containing mixing spheres 99.

Those baffles 102 which are located between second channel location 98 and downstream channel end 27 constitute structure for directing the fluid cooling mixture into contact with the channel walls of the conversion stage at 31, 32.

The upstream cooling portion of channel 24 constitutes about one-third of the length of channel 24, with the conversion stage 31, 32 constituting about two-thirds of the length of channel 24. The vertical spacings between (a) those baffles 102 which are disposed alongside the channel's upstream cooling portion is less than the vertical spacings between (b) those baffles 102 which are disposed alongside that part of the conversion stage at 32 which contains the high activity catalyzing agent. The vertical spacing between (c) those baffles 102 which are disposed alongside that part of the conversion stage at 31 (containing the high temperature catalyzing agent) is a gradual transition from (a) the vertical spacing between the baffles disposed alongside the channel's upstream cooling portion and (b) the vertical spacing between the baffles disposed alongside that part of the conversion stage at 32 (containing the high activity catalyzing agent).

As previously noted the stream of first gaseous mixture ($SO_2$ and air) enters upstream channel end 26 at a temperature higher than the temperature range which is favorable to initiate the catalytic conversion of $SO_2$ to $SO_3$, and the conversion reaction, once initiated, is exothermic and will increase the temperature of the gaseous stream in the absence of a restraining expedient. By employing the structure and equipment described above, the gaseous stream is initially cooled to a temperature within the temperature range favorable to the initiation of catalytic conversion, and is maintained within a temperature range which will sustain conversion of $SO_2$ to $SO_3$ continuously without interruption from the upstream end to the downstream end of the conversion stage at 31, 32.

The gaseous stream initially is cooled to a temperature within the favorable temperature range at the upstream channel portion 97 between channel upstream end 26 and a location 98 substantially less than half-way to downstream channel end 27. The gaseous stream is then maintained within a temperature range which will sustain conversion substantially continuously downstream of upstream channel portion 97, all the way to downstream channel end 27. Location 98 is the upstream end of the channel's conversion stage, and downstream channel end 27 is the downstream end of the channel's conversion stage, in the embodiment of FIG. 7.

The fluid cooling streams introduced through inlets 37, 38 are typically air at ambient temperature. The first fluid cooling stream, introduced at inlet 37, has a volume flow rate at the first channel location, adjacent channel downstream end 26, large enough to cool the stream in channel 24 to a temperature within the favorable temperature range, in upstream channel portion 97. However, by the time the first fluid cooling stream reaches second channel location 98, the first fluid cooling stream has a temperature higher than its initial temperature; and this higher temperature is insufficient to maintain the temperature of the gaseous oxide-containing stream in channel 24 within a temperature range which will sustain conversion substantially continuously from second channel location 98 to the third channel location at downstream channel end 27. The insufficiency described in the preceding sentence is remedied by mixing the first fluid cooling stream with a second fluid cooling stream introduced through inlet 38. The second fluid cooling stream has a volume flow rate, at second channel location 98, large enough to produce a temperature, in the mixture of fluid cooling streams, which will maintain the temperature of the gaseous oxide-containing stream in channel 24 within a temperature range which will sustain conversion substantially continuously from second channel location 98 to the third channel location at channel downstream end 27.

As previously noted, the volume flow rate of the fluid cooling medium entering the interior of converter vessel 23 through inlet 37 is controlled by a signal from a temperature measuring element 61 (FIG. 1) the disposition of which is shown in more detail in FIG. 2. That part of temperature measuring element 61 shown in FIG. 2 includes a thermocouple 116 located in channel 24 adjacent second channel location 98 (FIG. 7), a location which also constitutes the downstream end of upstream channel portion 97. A vertically disposed electrical conductor 117, appropriately protected from the environment within channel 24, extends from thermocouple 116 upwardly through the top of converter 22 for connection with a part of temperature measuring element 61 which is not shown in FIGS. 1 or 2 but which is of conventional construction and contains a temperature indicator.

Figure 3:
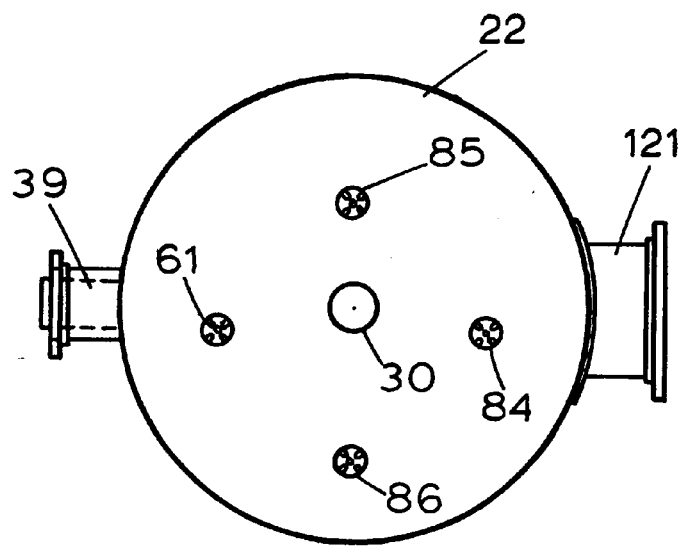
FIG. 3 is a plan view of the converter of FIG. 2.

In the embodiment illustrated in FIG. 1, there are three additional temperature measuring elements 84, 85, 86 associated with converter 22. Each of these temperature measuring elements includes a bundle of several thermocouples each located in the same channel 24 at respective, vertically spaced-apart locations. The purpose of these thermocouples is to sense the temperature within the channel at vertically spaced locations between downstream channel end 27 and upstream channel end 26. Each thermocouple is of conventional construction and has associated with it conventional components for indicating the temperature sensed by the particular thermocouple. Each of temperature measuring elements 84, 85, 86 are spaced apart from each other and from temperature measuring element 61, as shown in FIG. 3. Temperature measuring elements 84, 85, 86 are optional and may be excluded in other embodiments of the present invention.

In another embodiment of the present invention, cooling fluid can be introduced through inlet 38 and split into two cooling substreams: a first such substream flows downstream toward outlet 39 as in the previously described embodiment; and the second substream flows downstream toward opening 37, through which the second substream is withdrawn and then vented to the atmosphere. The cooling fluid introduced at inlet 38 and withdrawn at opening 37 performs the cooling function for upstream channel portion 97 (FIG. 2). The cooling fluid introduced at 38 and withdrawn at 39 cools catalyst-containing channel portions 31, 32.

In the embodiment described in the preceding paragraph, flow control valve 63, which, in the embodiment of FIG. 1, is on inlet line 62 connected to inlet 38 (see FIG. 1), is removed from line 62 and placed on line 69 which is connected to outlet 39; flow control valve 59, which is on line 58 connected to opening 37, is retained on line 58. Flow control valve 59 is controlled by the same system as in the embodiment illustrated in FIGS. 1 and 2, namely thermocouple 116 (FIG. 2) connected, via temperature measuring element 61 and controller 60, to valve 59. Valve 63 (moved, in the embodiment described in the preceding paragraph, from line 62 to line 69) is controlled by the same system as in the embodiment illustrated in FIG. 1, namely temperature measuring element 65 connected, via controller 64, to valve 63. In the embodiment described in the preceding paragraph, all cooling fluid enters the interior of converter vessel 23 through inlet 38, and the flow of cooling fluid toward outlets 37 and 39 is controlled by the throttling of valves 59 and 63, respectively.

Figure 11:
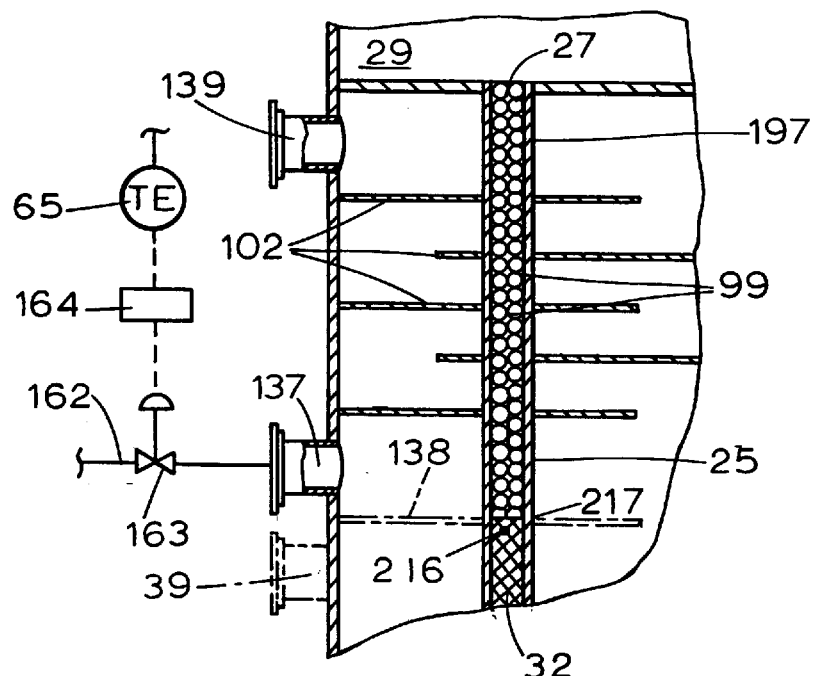
FIG. 11 is a fragmentary, vertical sectional view, similar to FIG. 7, illustrating another embodiment of the present invention.
Figure 12:
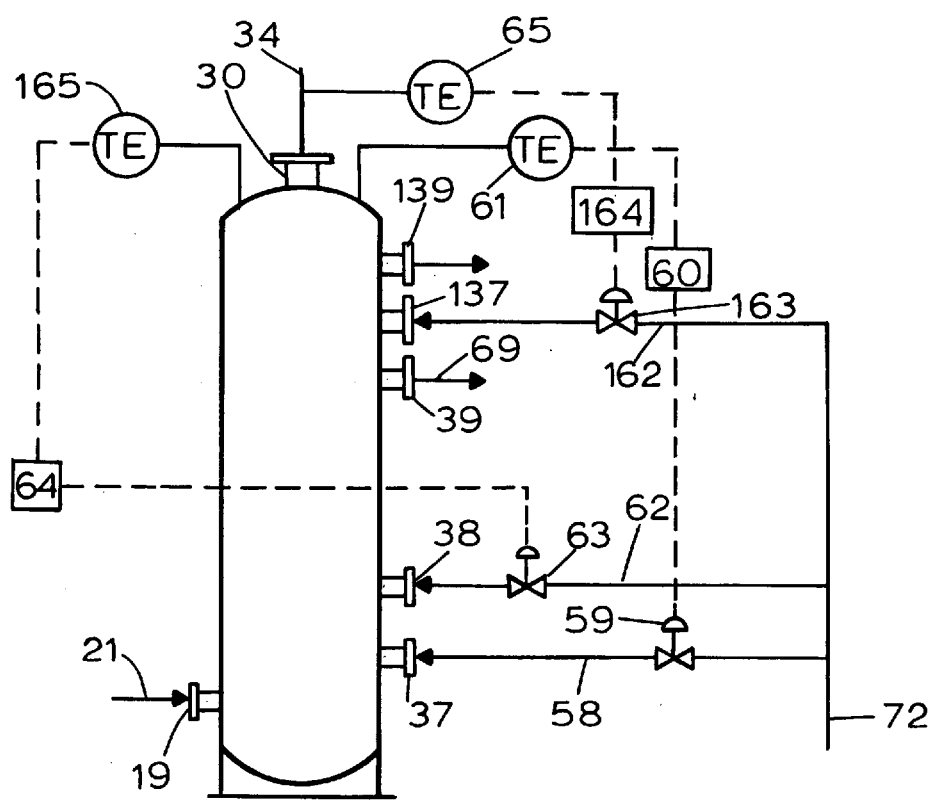
FIG. 12 is a fragmentary schematic diagram of the embodiment of FIG. 11.

FIGS. 11 and 12 illustrate another embodiment of the present invention in which channel 24 includes a downstream cooling stage or portion 197 located downstream of the conversion stage at 31, 32. Downstream cooling stage 197 has an upstream end 217 and a downstream end corresponding to downstream end 27 of channel 24. Downstream cooling stage 197 is similar to upstream cooling portion 97 and contains cooling spheres 99, or the like, which function in the same manner as cooling spheres 99 in upstream cooling portion 97.

Downstream cooling stage 197 is cooled by a cooling fluid (e.g. air) introduced into the converter through a cooling fluid inlet 137 at a location adjacent the upstream end 217 of downstream cooling stage 197. Cooling fluid introduced at 137 is directed, by horizontally staggered, vertically spaced baffles 102, along a tortuous path which terminates at a cooling fluid outlet 139 at a location adjacent downstream end 27 of channel 24 and through which the cooling fluid is withdrawn from the converter.

The flow rate of cooling fluid to inlet 137 is controlled by a valve 163 on a line 162 communicating with inlet 137. Valve 163 is controlled, through a controller 164, by temperature measuring element 65 which senses the temperature in line 34 from converter outlet 30, adjacent outlet 30; this temperature is essentially the same as the temperature at downstream end 27 of downstream cooling stage 197. As an alternative to sensing the temperature at line 34, adjacent outlet 30, one may sense the temperature in channel 24 at its downstream end 27 which is also the downstream end of downstream cooling stage 197, in the embodiment of FIG. 11. Referring to FIG. 1, line 162 is connected to line 72 which in turn is connected to blower 157 (or 57). The connection of line 162 to line 72 is downstream from the connection of line 72 to line 62 (FIGS. 1 and 12).

A thermocouple 216 located adjacent upstream end 217 of cooling stage 197 senses the temperature there; that temperature is communicated to a temperature measuring element 165 which sends a signal to controller 64 which adjusts control valve 63 on line 62 connected to cooling air inlet 38. Cooling fluid flow to inlet 37 is controlled, in the embodiment of FIGS. 11–12, in the same manner as in the embodiment of FIGS. 1, 2 and 7: a valve 59, on line 58 leading to inlet 37, is controlled, through a controller 60, by a temperature measuring element 61 connected to a thermocouple 116 located adjacent upstream end 98 of conversion stage 31, 32 (FIGS. 2 and 7).

Cooling fluid introduced at inlets 37 and 38 are combined adjacent the upstream end 98 of conversion stage 31, 32 (FIG. 7). In one variation of the embodiment of FIG. 11, outlet 39 is eliminated, and the two cooling fluids which are introduced at inlets 37, 38 and then combined at 98 (FIG. 7), are combined at 217 with fluid introduced at inlet 137 (FIG. 11); the combined fluids from 37, 38 and 137 are withdrawn from the converter through outlet 139 (FIG. 11). As the cooling fluids introduced at 37 and 38 flow downstream toward inlet 137, they undergo warming as they cool tubular members 25 and the gaseous mixture in channels 24.

In another variation of the embodiment of FIG. 11, outlet 39 is retained and used to withdraw fluid introduced at 37 and 38. That part of the interior of vessel 23 containing downstream cooling stage 197 of channel 24 is sealed from upstream parts of converter vessel interior 23 by a sealing plate 138, and only fluid introduced at inlet 137 is withdrawn at outlet 139. In this variation, cooling fluid introduced at inlet 137 is not mixed with the fluids introduced at inlets 37 and 38 which have been warmed by the time they reach outlet 39, and which, if mixed with the fluid introduced at inlet 137, could absorb some of the cooling capacity thereof.

Referring again to tubular man-ways 120, 121 for providing access to upstream and downstream manifolds 28, 29, respectively, each man-way contains a removable plug (to be described below) for preventing excessive heating of the tubular man-way, particularly at its outer end. The man-ways allow access into manifolds 28, 29 for introducing, into channels 24, mixing spheres 99 and the catalyzing agents at 31, 32. Channels 24 are initially loaded with mixing spheres and catalyzing agents after converter 22 has been installed at its operational site. After channels 24 have been loaded with the mixing spheres and catalyzing agents, man-ways 120, 121 are closed and plugged in the manner described below, for example.

Figure 8:
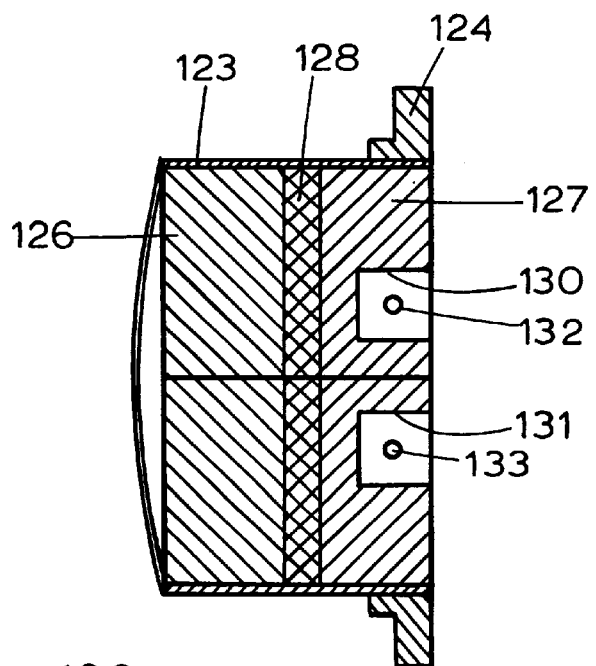
FIG. 8 is an enlarged, vertical sectional view illustrating a man-way attached to the converter vessel and used to obtain access to the interior of the converter vessel.
Figure 9:
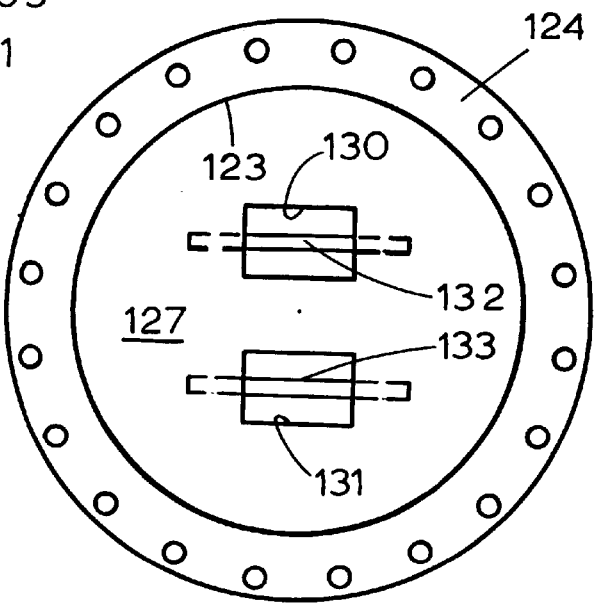
FIG. 9 is an enlarged end view of the man-way illustrated in FIG. 8.

As shown in FIGS. 7–9, each man-way 120, 121 comprises a tubular portion 123 having an inner end communicating with a respective manifold 28 or 29 and an outer end around which is located a flange 124 to which is attached a closure plate (not shown) sandwiching a gasket (also not shown) between the closure plate and flange 124. Filling the interior of tubular man-way portion 123 is a plug comprising an inner portion 126, an outer portion 127 and a transition portion 128 between the inner and outer portions.

Each of plug portions 126, 127, 128 is composed of a respective castable material which is cast in place within the man-way. Each plug portion is composed of a heat-resistant material. Plug portion 126 is the most heat-resistant and is a refractory material. Plug portion 127 has a lower heat resistance than plug portion 126 and is a thermal insulating material. Plug portion 128 is composed of a material which has a heat resistance between that of plug portion 126 and that of plug portion 127. Each plug portion 126, 127, 128 may be applied with a gun conventionally used for applying castable heat-resistant or refractory materials.

The heat-resistant plug portions prevent excessive heating and thermal expansion of tubular portion 123 and flange 124 during production of $SO_3$. This allows one to seal the joint between flange 124 and its closure plate with relatively less pressure, compared to the pressure required for a man-way without plug portions 126, 127, 128; it also enables one to use a less expensive grade of material for flange 124 (e.g. carbon steel plate rather than stainless steel).

One example of a castable refractory material for plug portion 126 is a material which is available from North American Refractories Co., Cleveland, Ohio, under the common chemical name fireclay castable, and which contains 10–30 wt. % crystalline silica (includes quartz, cristobalite and tridymite). Other ingredients (the balance) include the following, each as a percentage of the balance.

| Ingredient | Wt. % of Balance |
| --- | --- |
| alumina silicate | 60.0–100.0 |
| hydrous alumina silicate | 5.0–10.0 |
| hydraulic setting cement | 10.0–30.0 |
| organic fibers | 0.1–1.0 |
| amorphous silica | 1.0–5.0 |

One example of a castable thermal insulat-material for plug portion 127 is also a material which is available from North American Refractories Co., under the common chemical name alumina silica insulating castable, and which contains less than 15% of the crystalline silica described in the preceding paragraph. Other ingredients (the balance) include the following, each as a percentage of the balance:

| Ingredient | Wt. % of Balance |
| --- | --- |
| alumina silicate | less than 50 |
| hydrous alumina silicate | less than 10 |
| hydraulic setting cement | less than 40 |
| silica | less than 20 |

Outer plug portion 127 contains recesses 130, 131 to provide access to rods 132, 133 respectively. Each rod 132, 133 has opposite ends embedded in outer plug portion 127 and constitutes a handle which may be grasped to remove the plug from the man-way, to allow access through the unplugged man-way to an adjacent manifold 28, 29.

Additional information, concerning processing and equipment details employed when producing gaseous sulfur trioxide, is described in the two patent publications identified above in the section entitled "Background Of The Invention". To the extent that the disclosures in those publications are consistent with the subject matter of the present invention, the subject matter disclosed there may be employed in conjunction with the present invention.

The foregoing detailed description has been given for clearness of understanding only, and no unnecessary limitations should be understood therefrom, as modifications will be obvious therefrom to those skilled in the art.

What is claimed is:

1. A process for producing sulfur trioxide ($SO_3$), said process comprising the steps of:

providing a first gaseous mixture, consisting essentially of sulfur dioxide ($SO_2$) and air, from a source for said mixture;

flowing a stream containing said first gaseous mixture through a plurality of tubular channels each having upstream and downstream ends;

providing each of said tubular channels with a single, uninterrupted conversion stage having upstream and downstream ends;

providing said conversion stage with a catalyzing agent for catalyzing the conversion of $SO_2$ to $SO_3$;

providing each of said tubular channels with an upstream channel portion, devoid of catalyzing agent, between the upstream end of the tubular channel and the upstream end of the conversion stage;

conducting said first gaseous mixture from said source to said conversion stage without heating said first gaseous mixture between said source and said upstream end of said conversion stage;

converting at least 95% of said $SO_2$ in said first gaseous mixture to $SO_3$, as said stream flows through said single conversion stage, to produce a second gaseous mixture consisting essentially of $SO_3$ and air at the downstream end of said conversion stage;

performing, in said single conversion stage, the totality of the conversion of $SO_2$ to $SO_3$;

maintaining said gaseous oxide-containing stream in substantially continuous, uninterrupted contact with said catalyzing agent between the upstream and downstream ends of the conversion stage;

cooling said gaseous oxide-containing stream by subjecting said stream to cooling air substantially continuously between the upstream end of the tubular channel and the downstream end of the conversion stage, without diluting said stream with said cooling air, while maintaining said uninterrupted contact between said stream and said catalyzing agent;

generating heat as a result of said conversion;

and providing said first gaseous mixture from said source with a gas temperature at the upstream end of the tubular channel that (a) requires cooling between said upstream end of the tubular channel and the upstream end of the conversion stage in order to initiate conversion in the conversion stage and (b), together with the heat generated by said conversion, requires said cooling by said cooling air substantially continuously between the upstream end of the tubular channel and the downstream end of the conversion stage to convert at least 95% of the $SO_2$ in said first gaseous mixture to $SO_3$ in said single conversion stage;

all of said previously recited steps cooperating to convert at least 95% of said $SO_2$ to $SO_3$ in said single conversion stage, while employing said non-diluting cooling air as the fluid cooling medium for said gaseous-oxide containing stream.

2. A process as recited in claim 1 wherein said cooling step comprises:

maintaining said gaseous oxide-containing stream within a temperature range which will continuously sustain conversion of said $SO_2$ to $SO_3$ without interruption as said stream flows through said single conversion stage and until the conversion to $SO_3$, of $SO_2$ from said first mixture, exceeds 97% in said single conversion stage.

3. A process as recited in claim 1 and comprising:

providing said first gaseous mixture at a temperature by reacting sulfur and air at a sulfur burner;

flowing said first gaseous mixture at about said temperature from said sulfur burner to a catalytic converter;

dividing said first gaseous mixture into a plurality of streams at said catalytic converter;

providing said catalytic converter with said plurality of channels each having upstream and downstream ends and each comprising one of said single conversion stages;

flowing each of said streams of the first gaseous mixture through a respective channel from said upstream channel end to said downstream channel end;

converting said $SO_2$ in said first gaseous mixture to $SO_3$, as said streams flow through said channels, to produce, in each of said streams, said second gaseous mixture consisting essentially of $SO_3$ and air at the downstream ends of said channels;

continuously cooling each gaseous oxide-containing stream as it flows through its channel and as the $SO_2$ therein undergoes conversion to $SO_3$;

said cooling step comprising said step of subjecting said stream to cooling air;

combining said streams of said second gaseous mixture downstream of the downstream ends of said channels;

and flowing said combined streams of said second gaseous mixture out of said converter.

4. A process as recited in claim 3 wherein:

each of said channels comprises a single, continuous, uninterrupted conversion stage terminating at said downstream channel end and containing all of the catalyzing agent to which the $SO_2$-containing stream is subjected in said converter;

and the conversion of $SO_2$ to $SO_3$ in said single stage has a yield which exceeds 97% by the time said stream reaches said downstream channel end.

5. A process as recited in claim 4 wherein: 99% of said $SO_2$ is converted to $SO_3$.

6. A process as recited in claim 3 wherein:

the gaseous oxide-containing stream entering said upstream channel end has a temperature higher than the temperature range which is favorable to the initiation of catalytic conversion of $SO_2$ to $SO_3$ by the catalyzing agent in said channels;

and said cooling step comprises cooling said gaseous oxide-containing stream to a temperature within said favorable temperature range and maintaining said gaseous oxide-containing stream within a temperature range which will continuously sustain conversion of said $SO_2$ to $SO_3$ as said stream flows through said conversion stage and until the conversion of $SO_2$ to $SO_3$ exceeds 97%.

7. A process as recited in claim 6 wherein:

said gaseous oxide-containing stream initially is cooled, to said temperature within said temperature range favorable to initiation of conversion, at an upstream channel portion between the upstream end of said channel and a location between said upstream and downstream channel ends;

and said gaseous oxide-containing stream is then maintained within said conversion-sustaining temperature range substantially continuously downstream of said upstream channel portion, all the way to the downstream channel end.

8. A process as recited in claim 7 wherein:

said cooling of said gaseous oxide-containing streams is performed without introducing a fluid cooling medium into any of said gaseous oxide-containing streams and without diverting any of said gaseous oxide-containing streams outside of said channels;

each of said channels is defined by a tubular member having an exterior surface;

and said cooling step comprises contacting said exterior surface with a first cooling air stream substantially continuously from a first channel location adjacent the upstream end of said channel to a second channel location downstream of said first channel location and upstream of said downstream channel end.

9. A process as recited in claim 8, wherein said cooling step further comprises:

mixing a second cooling air stream with said first cooling air stream at said second channel location;

and contacting said exterior channel surface with a mixture of said first and second cooling air streams substantially continuously from said second channel location to a third channel location adjacent said downstream channel end.

10. A process as recited in claim 8 or 9 wherein:

said tubular member is composed of uninsulated, thermal conducting material.

11. A process as recited in claim 9 wherein:

said first cooling air stream has an initial temperature, at said first channel location, and a volume flow rate which are sufficient to cool the gaseous oxide-containing stream in said channel to a temperature within said temperature range favorable to initiation of conversion, as the gaseous oxide-containing stream flows through said upstream channel portion;

said first cooling air stream undergoes heating, in said channel, to an increased temperature, at said second channel location, which is higher than the initial temperature of said first cooling air stream and which is insufficient to enable said first cooling air stream to maintain the temperature of the gaseous oxide-containing stream in said channel within said conversion-sustaining temperature range substantially continuously from said second channel location to said third channel location, absent said mixing of the first cooling air steam with said second cooling air stream;

and said second cooling air stream has an initial temperature, at said second channel location, and a volume flow rate which are sufficient to produce a temperature in said mixture of cooling air streams which will maintain the temperature of the gaseous oxide-containing stream in the channel within said conversion-sustaining temperature range substantially continuously from said second channel location to said third channel location.

12. A process as recited in claim 3 wherein:

each of said channels comprises a single, continuous, uninterrupted conversion stage terminating at said downstream channel end;

said process comprises subjecting each gaseous oxide-containing stream to a high temperature catalyzing agent in said conversion stage, along a channel portion which is downstream of said upstream channel end and upstream of said downstream channel end;

said process further comprises subjecting said gaseous oxide-containing stream to a high activity catalyzing agent in said conversion stage, along a channel portion between said high temperature catalyzing agent and said downstream channel end.

13. A process as recited in claim 12 wherein:

said upstream channel portion is upstream of said high temperature catalyzing agent.

14. A process as recited in claim 13 and comprising:

further mixing the $SO_2$ and air in said gaseous stream as the stream flows through said upstream channel portion.

15. A process as recited in claim 12 wherein:

said single conversion stage contains all of the catalyzing agent to which said $SO_2$-containing gaseous stream is subjected in said converter;

and the conversion of $SO_2$ to $SO_3$ in said single conversion stage has a yield which exceeds 97%.

16. A process as recited in claim 15 wherein: 99% of said $SO_2$ is converted to $SO_3$.

17. A-process as recited in claim 3 wherein:

said converter comprises a vessel containing said channels;

and said cooling of said gaseous oxide-containing streams is performed without introducing a fluid cooling medium into any of said gaseous oxide-containing streams and without diverting any of said gaseous oxide-containing streams outside of said channels in said vessel.

18. A process as recited in claim 17 wherein said cooling of said gaseous oxide-containing streams in the channels comprises:
   flowing a first cooling air stream into said converter at a first location adjacent the upstream end of each channel;
   sensing the temperature of the gaseous oxide-containing stream in a channel, adjacent the upstream end of the conversion stage in said channel;
   and controlling the flow of said first cooling air stream into said converter in response to the temperature sensed adjacent the upstream end of said conversion stage in the channel.

19. A process as recited in claim 18 wherein said cooling of said gaseous oxide-containing streams in the channels further comprises:
   flowing a second cooling air stream into said converter at a second location which is between said first location and the downstream channel ends and which is adjacent said upstream end of the conversion stage;
   sensing the temperature of the second gaseous mixture flowing out of said converter;
   and controlling the flow of said second cooling air stream into said converter in response to said sensing of the temperature of the second gaseous mixture.

20. A process as recited in claim 19 and comprising:
   cooling said gaseous oxide-containing streams in said channels with said first cooling air stream, substantially continuously from said first location to said second location;
   mixing said first cooling air stream with said second cooling air stream to produce a mixture of cooling air streams between said second location and the downstream channel ends;
   and cooling said gaseous oxide-containing streams in said channels with said mixture of cooling air streams, substantially continuously from said second location to the downstream channel ends.

21. A process as recited in any of claims 18–20 wherein:
   the flow of each of said cooling air streams through said converter vessel is in the same direction as the flow through said channels of said gaseous oxide-containing streams.

22. A process as recited in claim 17 wherein said cooling of said gaseous oxide-containing streams in the channels comprises:
   introducing a cooling air stream into said converter at a location adjacent said upstream ends of the conversion stage in said channels;
   withdrawing at least part of said cooling air stream from said converter at a location adjacent the upstream ends of the channels;
   sensing the temperature of the gaseous oxide-containing stream in a channel, adjacent the upstream end of the conversion stage in said channel;
   and controlling said withdrawal of said cooling air stream from said converter, at said location adjacent the upstream ends of the channels, in response to the temperature sensed in said channel adjacent the upstream end of said conversion stage therein.

23. A process as recited in claim 22 wherein said cooling of said gaseous oxide-containing streams in the channels further comprises:
   dividing said cooling air stream into two substreams;
   withdrawing one substream at said location adjacent the upstream ends of the channels;
   withdrawing the other substream at a location adjacent the downstream ends of said channels;
   sensing the temperature of the second gaseous mixture flowing out of the converter;
   and controlling the withdrawal of said other substream, at said location adjacent the downstream ends of said channels, in response to the temperature sensed in said second gaseous mixture flowing out of the converter.

24. A process as recited in claim 17 wherein said cooling of said gaseous oxide-containing streams in the channels comprises:
   flowing a first cooling air stream into said converter at a location adjacent said upstream ends of the conversion stages in said channels;
   flowing a second cooling air stream into said converter at a location adjacent the downstream ends of said channels;
   combining said cooling air streams at said location adjacent said upstream ends of the conversion stages;
   withdrawing said combined cooling air streams from said converter at a location adjacent the upstream ends of said channels;
   sensing the temperature of the gaseous oxide-containing stream in a channel, adjacent the upstream end of the conversion stage in said channel;
   controlling the flow of the first cooling air stream into said converter in response to said sensing of the temperature in said gaseous oxide-containing stream;
   sensing the temperature of the second gaseous mixture flowing out of the converter;
   and controlling the flow of the second cooling air stream into said converter in response to said sensing of the temperature of said second gaseous mixture.

25. A process as recited in claim 17 wherein each of said channels comprises a downstream cooling stage located between (a) said downstream end of said conversion stage in said channel and (b) said downstream channel end, said downstream cooling stage having upstream and downstream ends, and wherein said cooling of said gaseous oxide-containing streams in the channels comprises:
   flowing a first cooling air stream into said converter at a first location adjacent the upstream end of each channel;
   flowing a second cooling air stream into said converter at a second location adjacent said upstream end of said conversion stage;
   flowing a third cooling air stream into said converter at a third location adjacent the upstream end of said downstream cooling stage;
   sensing the temperature of the gaseous oxide-containing stream in a channel, adjacent the upstream end of the conversion stage in the channel;
   controlling the flow of said first cooling air stream in response to said temperature sensed adjacent the upstream end of the conversion stage;
   sensing the temperature of the gaseous oxide-containing stream in a channel, adjacent the downstream end of the conversion stage in the channel;
   controlling the flow of said second cooling air stream into said converter in response to said temperature sensed adjacent the downstream end of the conversion stage;

sensing the temperature of the gaseous oxide-containing stream in a channel adjacent the downstream end of the downstream cooling stage in said channel;

and controlling the flow of said third cooling air stream into said converter in response to the temperature sensed at the downstream end of the downstream cooling stage.

26. A process as recited in claim 25 and comprising:

combining said first and second cooling air streams at said second location;

combining said third cooling air stream with the first and second cooling air streams at said third location;

and withdrawing said combined cooling air streams from said converter at a fourth location adjacent the downstream end of the downstream cooling stage.

27. A process as recited in claim 25 and comprising:

combining said first and second cooling air streams at said second location;

withdrawing said combined first and second cooling air streams from said converter at a location which is upstream of said third location and adjacent the downstream end of said conversion stage;

and withdrawing said third cooling air stream from said converter at a fourth location adjacent the downstream end of the downstream cooling stage.

28. A process as recited in claim 1 wherein:

said source for said first gaseous mixture is a sulfur burner;

and said step of providing said first gaseous mixture comprises reacting sulfur with air at said sulfur burner.

29. An apparatus for producing sulfur trioxide ($SO_3$) from sulfur dioxide ($SO_2$) in a single conversion stage, said apparatus comprising the following elements:

means for providing, from a source, a first gaseous mixture consisting essentially of sulfur dioxide ($SO_2$) and air;

a catalytic converter comprising a plurality of tubular channels each having an upstream end and a downstream end;

each of said tubular channels comprising a single, uninterrupted conversion stage having upstream and downstream ends;

said conversion stage comprising a catalyzing agent and means for containing the catalyzing agent in a substantially continuous, uninterrupted disposition from the upstream end to the downstream end of the conversion stage;

said catalyzing agent comprising means for catalyzing the conversion of $SO_2$ to $SO_3$;

each of said tubular channels comprising an upstream cooling portion, devoid of catalyzing agent, between the upstream end of the tubular channel and the upstream end of the conversion stage;

means for conducting said first gaseous mixture from said source to said conversion stage without heating said first gaseous mixture between said source and said conversion stage;

means operable to flow a stream containing said first gaseous mixture through said conversion stage;

said single conversion stage comprising means for converting said $SO_2$ in said first gaseous mixture to $SO_3$, as said stream flows through said single conversion stage, to produce a second gaseous mixture consisting essentially of $SO_3$ and air at the downstream end of said conversion stage;

said conversion stage comprising means for maintaining said gaseous oxide-containing stream in substantially continuous, uninterrupted contact with said catalyzing agent between the upstream and downstream ends of the conversion stage;

said single conversion stage comprising means for performing the totality of the conversion of $SO_2$ to $SO_3$ that occurs in said apparatus;

means for providing cooling air;

and means for cooling said gaseous oxide-containing stream by subjecting said stream to said cooling air substantially continuously between the upstream end of each tubular channel and the downstream end of the conversion stage in said channel, without diluting said stream with said cooling air, while maintaining said uninterrupted contact between said stream and said catalyzing agent;

said conversion stage comprising means for generating heat as a result of said conversion;

said means for providing said first gaseous mixture comprising means for providing said gaseous mixture with a gas temperature at the upstream end of the tubular channel that (a) requires cooling between said upstream end of the tubular channel and the upstream end of the conversion stage in order to initiate conversion in the conversion stage and (b), together with the heat generated at said conversion stage, requires said cooling by said cooling air substantially continuously between the upstream end of the tubular channel and the downstream end of the conversion stage to convert at least 95% of the $SO_2$ in said first gaseous mixture to $SO_3$ in said single conversion stage;

all of said previously recited elements comprising means cooperating to convert at least 95% of said $SO_2$ to $SO_3$ in said single conversion stage, while employing said non-diluting cooling air as the fluid cooling medium for said gaseous-oxide containing stream.

30. An apparatus as recited in claim 29 wherein said converter comprises:

upstream manifold means, communicating with the upstream ends of said channels, for receiving said first gaseous mixture comprising $SO_2$ and air and for directing a portion of said first mixture into each upstream channel end to form a plurality of streams containing said first mixture at said upstream channel ends;

and downstream manifold means, communicating with the downstream ends of said channels, for receiving and combining said streams as they flow out of said channels.

31. The apparatus of claim 30 wherein:

said source comprises a sulfur burner upstream of said converter;

said sulfur burner comprising means for producing said first gaseous mixture at a temperature;

and said conducting means comprises means for flowing said first gaseous mixture into said converter at about said temperature.

32. An apparatus as recited in claim 30 or claim 31 wherein:

said converter comprises a vessel containing said channels; and said means for cooling each gaseous oxide-containing stream comprises means for doing so without introducing a fluid cooling medium into any of said gaseous oxide-containing streams and without diverting any of said gaseous oxide-containing streams outside of said channels in said vessel.

33. An apparatus as recited in claim 30 wherein:

said converter comprises a vessel containing said channels;

and each conversion stage terminates at said downstream end of the channel comprising said conversion stage.

34. An apparatus as recited in claim 33 wherein:

said single conversion stage comprises means for containing all of the catalyzing agent to which said $SO_2$-containing gaseous stream is subjected in said converter;

all of said previously recited elements comprising means cooperating to convert more than 97% of said $SO_2$ to $SO_3$ in said single conversion stage.

35. An apparatus as recited in claim 30 wherein said means for providing said gaseous mixture comprises means for providing said mixture with a gas temperature at said upstream channel end higher than the temperature range which is favorable to the initiation of catalytic conversion of $SO_2$ to $SO_3$ by the catalyzing agent in said catalytic conversion channels, and wherein:

said cooling means comprises (a) means for cooling said gaseous oxide-containing stream to a temperature within said favorable temperature range, and (b) means for maintaining said gaseous oxide-containing stream within a temperature range which will continuously sustain conversion of said $SO_2$ to $SO_3$ as said stream flows through said conversion stage;

all of said previously recited elements comprising means cooperating to convert at least 97% of said $SO_2$ to $SO_3$ in said single conversion stage.

36. An apparatus as recited in claim 35 wherein:

said means for cooling said gaseous oxide-containing stream, to said temperature within said temperature range favorable to initiation of conversion, comprises means for doing so at an upstream channel portion between the upstream end of said channel and a location between said upstream and downstream channel ends;

and said means for maintaining said gaseous oxide-containing stream within said conversion-sustaining temperature range comprises means for doing so substantially continuously downstream of said upstream channel portion, to the downstream channel end.

37. An apparatus as recited in claim 35 wherein:

said converter comprises a vessel containing said channels;

each of said channels is defined by a tubular member having an exterior surface;

said cooling means comprises means for cooling each gaseous oxide-containing stream without introducing a fluid cooling medium into any of said gaseous oxide-containing streams and without diverting any of said gaseous oxide-containing streams outside of said channels in said vessel;

and said cooling means further comprises means for directing a first cooling air stream into contact with said exterior surface substantially continuously from a first channel location adjacent the upstream end of said channel to a second channel location downstream of said first channel location and upstream of said downstream channel end.

38. An apparatus as recited in claim 37 wherein said cooling means further comprises:

means for mixing a second cooling air stream with said first cooling air stream at a second channel location;

and means for directing a mixture of said first and second cooling air streams into contact with said exterior surface substantially continuously from said second channel location to a third channel location adjacent said downstream channel end.

39. An apparatus as recited in claim 37 or 38 wherein:

said tubular member is composed of uninsulated, thermal conducting material.

40. An apparatus as recited in claim 37 or 38 and further comprising equipment for use when said means operable to flow said gaseous first mixture of $SO_2$ and air through said conversion stage is not operating, said equipment comprising:

means for adjusting the temperature of each of said cooling air streams prior to contacting said cooling air stream with an exterior channel surface.

41. An apparatus as recited in claim 40 and comprising:

means for diverting said mixture of cooling air streams away from contact with said channel, at said third channel location;

means for recycling part of said diverted mixture back to said first and second channel locations;

and means for adjusting the temperature of said recycled part before it reaches said first and second channel locations.

42. An apparatus as recited in claim 41 and comprising:

means for mixing said recycled part with unrecycled cooling air before said recycled part reaches said first and second channel locations.

43. An apparatus as recited in claim 30 wherein:

said converter comprises a vessel containing said channels;

each conversion stage terminates at said downstream end of the channel comprising said conversion stage;

said conversion stage comprises means for containing a high temperature catalyzing agent between said upstream channel end and an intermediate channel location which is between said upstream and downstream channel ends;

and said conversion stage further comprises a high activity catalyzing agent between said intermediate channel location and said downstream channel end.

44. An apparatus as recited in claim 43 wherein:

said upstream cooling portion is upstream of said high temperature catalyzing agent;

and said upstream cooling portion comprises mixing means for further mixing said $SO_2$ and air in said gaseous stream as the gaseous stream flows through said upstream cooling portion.

45. An apparatus as recited in claim 44 wherein:

each channel contains a high temperature catalyzing agent between said upstream channel end and said intermediate channel location;

each channel contains a high activity catalyzing agent between said intermediate channel location and said downstream channel end;

each upstream cooling portion contains said mixing means;

said single conversion stage contains all of the catalyzing agent to which said $SO_2$-containing gaseous stream is subjected in said converter;

and all of said previously recited elements comprising means cooperating to convert more than 97% of said $SO_2$ to $SO_3$ between the upstream and downstream channel ends of said single conversion stage.

46. An apparatus as recited in claim 30 wherein:

each of said channels is defined by a tubular member having an exterior surface;

and said cooling means comprises means for directing a first cooling air stream into contact with said exterior surface substantially continuously from a first channel location adjacent the upstream end of said channel to a second channel location downstream of said first channel location and upstream of said downstream channel end.

47. An apparatus as recited in claim 46 wherein said cooling means comprises:

means for mixing a second cooling air stream with said first cooling air stream at said second channel location;

and means for directing a mixture of said cooling air streams into contact with said exterior surface substantially continuously from said second channel location to a third channel location adjacent said downstream channel end.

48. An apparatus as recited in claim 47 wherein:

said converter comprises a vessel containing said channels;

each channel extends in a substantially straight-line direction from the upstream channel end to the downstream channel end;

and each of said directing means comprises baffle means contained in said vessel and cooperating to define a tortuous path in said vessel for said cooling air streams;

said tortuous path comprising a multiplicity of connected, adjacent path parts each extending in a direction transverse to said direction in which said channel extends;

each path part has an upstream end and a downstream end;

and each path part extends from its upstream end to its downstream end in a direction opposite the direction in which an adjacent, connected path part extends.

49. An apparatus as recited in claim 48 wherein:

each of said channels is defined by an elongated tubular member disposed in spaced-apart, parallel relation to the other tubular members.

50. An apparatus as recited in claim 30 wherein:

each of said channels is defined by an elongated tubular member disposed in spaced-apart relation to the other tubular members;

said converter comprises a vessel having an external shell defining an interior in which said tubular members are located;

said tubular members are composed of stainless steel;

and said external shell is composed of non-stainless, carbon steel.

51. An apparatus as recited in claim 30 wherein:

said converter comprises a vertically disposed vessel having a pair of vertically spaced-apart vessel ends;

said upstream manifold means is located adjacent one of said vessel ends;

said downstream manifold means is located adjacent the other of said vessel ends;

and said channels are vertically disposed and are located within said vessel between said upstream manifold means and said downstream manifold means.

52. An apparatus as recited in claim 51 wherein said source comprises a sulfur burner for reacting air and sulfur to produce said first gaseous mixture:

said sulfur burner comprising a vertically disposed vessel having a pair of vertically spaced-apart vessel ends;

inlet means, adjacent one of said vessel ends, for introducing air and sulfur into said sulfur burner;

outlet means, adjacent the other of said vessel ends, for withdrawing, from said sulfur burner, said first gaseous mixture at a temperature;

and means within said vessel, between said inlet means and said outlet means, defining a reaction zone for reacting sulfur and air to produce $SO_2$;

said vertically disposed converter vessel and said vertically disposed sulfur burner vessel being arranged in adjacent side-by-side relation;

said conducting means comprising conduit means for directly connecting said outlet means of said sulfur burner vessel to said upstream manifold means of said converter for delivering said first gaseous mixture into said converter at about said temperature.

53. An apparatus as recited in claim 52 wherein:

the distance between said sulfur burner vessel and said converter vessel is relatively short compared to the distance between such vessels in a combination thereof employing cooling equipment specifically dedicated to cooling of said first gaseous mixture between said vessels;

and the length of said conduit means is correspondingly small compared to the length of such conduit means in a combination employing said cooling equipment.

54. An apparatus as recited in claim 30 wherein each channel comprises:

channel walls;

said conversion stage terminating at said downstream channel end;

said upstream cooling portion comprising mixing means (a) for mixing said $SO_2$ and air in said gaseous stream and (b) for conducting heat from said gaseous stream to the channel walls, as the gaseous stream flows through said upstream cooling portion.

55. An apparatus as recited in claim 51 and comprising:

means for contacting a first cooling air stream with said channel walls of the upstream portion of the channel;

means for mixing a second cooling air stream with said first cooling air stream at the upstream end of said conversion stage to form a cooling mixture;

and means for contacting said cooling air mixture with said channel walls of the conversion stage.

56. An apparatus as recited in claim 30 wherein said converter comprises a vessel containing said channels and said means for cooling each gaseous oxide-containing stream comprises:

means for cooling each gaseous oxide-containing stream without introducing a fluid cooling medium into any of said gaseous oxide-containing streams and without diverting said gaseous oxide-containing streams outside of said channels in said vessel;

means for flowing a first cooling air stream into said converter at a first location adjacent the upstream end of each channel;

means for sensing the temperature of the gaseous oxide-containing stream in a channel, adjacent the upstream end of the conversion stage in the channel;

and means for controlling the flow of said cooling air stream into said converter in response to the temperature sensed adjacent the upstream end of said conversion stage in said channel.

57. An apparatus as recited in claim 56 wherein said means for cooling each gaseous oxide-containing stream further comprises:
  means for flowing a second cooling air stream into said converter at a second location which is between said first location and the downstream channel ends and which is adjacent the upstream end of the conversion stage;
  means for sensing the temperature of the second gaseous mixture flowing out of said converter;
  and means for controlling the flow of said second cooling air stream into said converter in response to said sensing of the temperature of the second gaseous mixture.

58. An apparatus as recited in claim 57 wherein:
  said means for cooling each gaseous oxide-containing stream with said first cooling air stream comprises means for doing so substantially continuously from said first location to said second location;
  said converter comprises means for mixing said first cooling air stream with said second cooling air stream to produce a mixture of cooling air streams between said second location and the downstream channel ends;
  and said means for cooling each gaseous oxide-containing stream further comprises means for doing so with said mixture of cooling air streams, substantially continuously from said second location to the downstream channel ends.

59. An apparatus as recited in any of claims 56–58 wherein said converter comprises:
  means for directing the flow of each of said cooling air streams through said converter vessel in the same direction as the flow through said channels of said gaseous oxide-containing streams.

60. An apparatus as recited in claim 30 wherein said converter comprises a vessel containing said channels and said means for cooling said gaseous oxide-containing streams in the channels comprises:
  means for cooling each gaseous oxide-containing stream without introducing a fluid cooling medium into any of said gaseous oxide-containing streams and without diverting said gaseous oxide-containing streams outside of said channels in said vessel;
  means for introducing a first cooling air stream into said converter at a location adjacent said upstream ends of the conversion stage in said channels;
  means for withdrawing at least part of said first cooling air stream from said converter at a location adjacent the upstream ends of the channels;
  means for sensing the temperature of the gaseous oxide-containing stream in a channel, adjacent the upstream end of the conversion stage in said channel;
  and means for controlling the withdrawal of said first cooling air stream from said converter, at said location adjacent the upstream ends of the channels, in response to the temperature sensed in said channel adjacent the upstream end of said conversion stage therein.

61. An apparatus as recited in claim 60 wherein said means for cooling said gaseous oxide-containing streams in the channels further comprises:
  means for dividing said first cooling air stream into two substreams;
  means for withdrawing one substream at said location adjacent the upstream ends of the channels;
  means for withdrawing the other substream at a location adjacent the downstream ends of said channels;
  means for sensing the temperature of the second gaseous mixture flowing out of the converter;
  and means for controlling the withdrawal of said other substream, at said location adjacent the downstream ends of said channels, in response to the temperature sensed in said second gaseous mixture flowing out of the converter.

62. An apparatus as recited in claim 30 wherein said converter comprises a vessel containing said channel and said means for cooling said gaseous oxide-containing streams flowing through the channels comprises:
  means for cooling each gaseous oxide-containing stream without introducing a fluid cooling medium into any of said gaseous oxide-containing streams and without diverting said gaseous oxide-containing streams outside of said channels in said vessel;
  means for flowing a first cooling air stream into said converter at a location adjacent said upstream ends of the conversion stages in said channels;
  means for flowing a second cooling air stream into said converter at a location adjacent the downstream ends of said channels;
  means for combining said cooling air streams at said location adjacent said upstream ends of the conversion stages;
  means for withdrawing said combined cooling air streams from said converter at a location adjacent the upstream ends of said channels;
  means for sensing the temperature of the gaseous oxide-containing stream in a channel, adjacent the upstream end of the conversion stage in said channel;
  means for controlling the flow of the first cooling air stream into said converter in response to said sensing of the temperature in said gaseous oxide-containing stream;
  means for sensing the temperature of the second gaseous mixture flowing out of the converter;
  and means for controlling the flow of the second cooling air stream into said converter in response to said sensing of the temperature of said second gaseous mixture.

63. An apparatus as recited in claim 30 wherein said converter comprises a vessel containing said channels and each of said channels comprises a downstream cooling stage located between (a) said downstream end of said conversion stage in said channel and (b) said downstream channel end, said downstream cooling stage having upstream and downstream ends, and wherein said means for cooling said gaseous oxide-containing streams flowing through the channels comprises:
  means for cooling each gaseous oxide-containing stream without introducing a fluid cooling medium into any of said gaseous oxide-containing streams and without diverting said gaseous oxide-containing streams outside of said channels in said vessel;
  means for flowing a first cooling air stream into said converter at a first location adjacent the upstream end of each channel;
  means for flowing a second cooling air stream into said converter at a second location adjacent said upstream end of said conversion stage;
  means for flowing a third cooling air stream into said converter at a third location adjacent the upstream end of said downstream cooling stage;
  means for sensing the temperature of the gaseous oxide-containing stream in a channel, adjacent the upstream end of the conversion stage in the channel;

means for controlling the flow of said first cooling air stream in response to said temperature sensed at the upstream end of the conversion stage;

means for sensing the temperature of the gaseous oxide-containing stream in a channel, adjacent the downstream end of the conversion stage in the channel;

means for controlling the flow of said second cooling air stream into said converter in response to said temperature sensed adjacent the downstream end of the conversion stage;

means for sensing the temperature of the gaseous oxide-containing stream in a channel, adjacent the downstream end of the downstream cooling stage in said channel;

and means for controlling the flow of said third cooling air stream into said converter in response to the temperature sensed at the downstream end of the downstream cooling stage.

64. An apparatus as recited in claim 63 and comprising:

means for combining said first and second cooling air streams at said second location;

means for combining said third cooling air stream with the first and second cooling air streams at said third location;

and means for withdrawing said combined cooling air streams from said converter at a fourth location adjacent the downstream end of the downstream cooling stage.

65. An apparatus as recited in claim 63 and comprising:

means for combining said first and second cooling air streams at said second location;

means for withdrawing said combined first and second cooling air streams from said converter at a location which is upstream of said third location and adjacent the downstream end of said conversion stage;

and means for withdrawing said third cooling air stream from said converter at a fourth location adjacent the downstream end of the downstream cooling stage.

66. An apparatus as recited in claim 29 and comprising:

means within said upstream cooling portion of said tubular channels for cooling said first gaseous mixture.

* * * * *

UNITED STATES PATENT AND TRADEMARK OFFICE
CERTIFICATE OF CORRECTION

PATENT NO. : 6,572,835 B1
DATED : June 3, 2003
INVENTOR(S) : Brian W. MacArthur et al.

It is certified that error appears in the above-identified patent and that said Letters Patent is hereby corrected as shown below:

Title page,
Item [57], ABSTRACT,
Line 1, please delete "sulfur comprises" and insert -- sulfur trioxide ($SO_3$), employs a sulfur burner for producing sulfur dioxide ($SO_2$), and a catalytic converter for converting the $SO_2$ to $SO_3$. The catalytic converter comprises -- in its place.

Column 17,
Line 49, please delete "($SO_2$ and air" and insert -- ($SO_2$) and air -- in its place.

Column 20,
Line 23, please delete "steam" and insert -- stream -- in its place.

Signed and Sealed this

Twenty-ninth Day of June, 2004

JON W. DUDAS
*Acting Director of the United States Patent and Trademark Office*